United States Patent
Hochstetter et al.

(10) Patent No.: US 11,945,135 B2
(45) Date of Patent: *Apr. 2, 2024

(54) PROCESS FOR MANUFACTURING A FIBROUS MATERIAL PRE-IMPREGNATED WITH THERMOPLASTIC POLYMER IN POWDER FORM

(71) Applicant: Arkema France, Colombes (FR)

(72) Inventors: Gilles Hochstetter, L'hay les Roses (FR); Arthur Pierre Babeau, Pau (FR); Thibaut Savart, Sauvagnon (FR); François Tanguy, Mantes-la-Jolie (FR); Denis Huze, Fontaine sous Jouy (FR); Mathieu Capelot, Bernay (FR); Patrice Gaillard, Hagetaubin (FR)

(73) Assignee: ARKEMA FRANCE, Colombes (FR)

( * ) Notice: Subject to any disclaimer, the term of this patent is extended or adjusted under 35 U.S.C. 154(b) by 448 days.

This patent is subject to a terminal disclaimer.

(21) Appl. No.: 16/470,390

(22) PCT Filed: Dec. 20, 2017

(86) PCT No.: PCT/FR2017/053729
§ 371 (c)(1),
(2) Date: Dec. 12, 2019

(87) PCT Pub. No.: WO2018/115737
PCT Pub. Date: Jun. 28, 2018

(65) Prior Publication Data
US 2020/0223101 A1 Jul. 16, 2020

(30) Foreign Application Priority Data
Dec. 22, 2016 (FR) ...................................... 1663204

(51) Int. Cl.
*B29B 15/12* (2006.01)
*B29C 70/20* (2006.01)
(Continued)

(52) U.S. Cl.
CPC .............. *B29B 15/12* (2013.01); *B29C 70/20* (2013.01); *B29K 2101/12* (2013.01); *B29K 2307/04* (2013.01)

(58) Field of Classification Search
None
See application file for complete search history.

(56) References Cited

U.S. PATENT DOCUMENTS

| 4,541,884 A | 9/1985 | Cogswell et al. |
| 5,137,766 A | 8/1992 | Mazanek et al. |

(Continued)

FOREIGN PATENT DOCUMENTS

| EP | 0201367 A1 | 11/1986 |
| EP | 0324680 A2 | 7/1989 |

(Continued)

OTHER PUBLICATIONS

International Search Report and Written Opinion for International Application No. PCT/FR2017/053729, dated Apr. 17. 2018—8 pages.

(Continued)

*Primary Examiner* — Robert J Grun
(74) *Attorney, Agent, or Firm* — Buchanan Ingersoll & Rooney PC

(57) ABSTRACT

The invention relates to a process for manufacturing a pre-impregnated fibrous material comprising a continuous fibre fibrous material and at least one thermoplastic polymer matrix, characterized in that said pre-impregnated fibrous material is made of a single unidirectional ribbon or a plurality of parallel ribbons unidirectional and in that said (Continued)

method comprises an impregnation step, in particular at the core, of said fibrous material being in the form of a roving or of several parallel rovings by said thermoplastic polymer being in powder form, said step of impregnation being carried out with said at least one thermoplastic polymer and said fibrous material the D90/D10 ratio of which by volume of the thermoplastic polymer particles ranges from 1.5 to 50, in particular from 2 to 10 and the ratio of the average diameter by volume (D50) thermoplastic polymer particles on the average diameter of the unit fibres of said fibrous material ranges from 3 to 40, except for an impregnation process in aqueous suspension of a fibrous material made of carbon fibres by a thermoplastic polymer, said D50/mean unit fibre diameter ratio being comprised from 3 to 8, and excluding any electrostatic process in voluntary charge.

28 Claims, 16 Drawing Sheets

(51) Int. Cl.
*B29C 70/54* (2006.01)
*B29K 101/12* (2006.01)
*B29K 307/04* (2006.01)

(56) References Cited

U.S. PATENT DOCUMENTS

| | | | |
|---|---|---|---|
| 5,187,018 | A | 2/1993 | Glemet |
| 5,276,883 | A | 1/1994 | Leone et al. |
| 8,640,739 | B2 | 2/2014 | Do et al. |
| 9,205,603 | B2 | 12/2015 | Beraud et al. |
| 10,000,662 | B2 | 6/2018 | Hochstetter et al. |
| 11,413,832 | B2 | 8/2022 | Hochstetter et al. |
| 2002/0197397 | A1 | 12/2002 | Staheli |
| 2013/0248087 | A1 | 9/2013 | Gaillard et al. |
| 2014/0322511 | A1* | 10/2014 | Beraud ............. B32B 5/022 428/220 |
| 2017/0165875 | A1 | 6/2017 | Gaillard et al. |
| 2017/0334094 | A1 | 11/2017 | Pellet et al. |

FOREIGN PATENT DOCUMENTS

| | | | |
|---|---|---|---|
| EP | 0335186 | A2 | 10/1989 |
| EP | 0406067 | A1 | 1/1991 |
| EP | 1505099 | A2 | 2/2005 |
| EP | 2586585 | A1 | 5/2013 |
| FR | 2600585 | A1 | 12/1987 |
| FR | 3017329 | A1 | 8/2015 |
| JP | H05154838 | A | 6/1993 |
| JP | H07040341 | A | 2/1995 |
| JP | H08150664 | A | 6/1996 |
| JP | 2019511593 | A | 4/2019 |
| WO | 9220521 | A1 | 11/1992 |
| WO | 2008135663 | A2 | 11/2008 |
| WO | 2012066241 | A2 | 5/2012 |
| WO | 2012164014 | A1 | 12/2012 |
| WO | 2015121583 | A2 | 8/2015 |
| WO | 2016062896 | A1 | 4/2016 |
| WO | 2016093248 | A1 | 6/2016 |

OTHER PUBLICATIONS

Miller et al., "Impregnation Techniques for Thermoplastic Matrix Composites", Polymers & Polymer Composites, vol. 4, No. 7, 1996—pp. 459-481.
Wang, "Composite Material Structure Design", Chemical Industry Press, p. 54, Sep. 2001 with translation, 8 pages.
JP Office Action Notice of Reasons for Refusal dated Dec. 7, 2021 (4 pages).
Chinese Third Office Action dated Aug. 16, 2021 (9 pages).
Wang, Composite Material Structure Design, Chemical Industry Press, pp. 54, Sep. 2001 (7 pages).

* cited by examiner

PROCESS FOR MANUFACTURING A FIBROUS MATERIAL PRE-IMPREGNATED WITH THERMOPLASTIC POLYMER IN POWDER FORM

FIELD OF THE INVENTION

The present invention relates to a method of manufacturing a fibrous material pre-impregnated with thermoplastic polymer in powder form.

More particularly, the invention relates to a method of manufacturing a pre-impregnated fibrous material comprising an impregnation step for the preparation of a pre-impregnated fibrous material, especially at its core of reduced and controlled porosity, to obtain pre-impregnated fibrous material ribbons, of calibrated dimensions, directly usable for the manufacture of three-dimensional composite parts.

In the present description, the term "fibrous material" refers to an assembly of reinforcing fibres. Before being shaped, it is in the form of rovings. After shaping, it becomes strips (or strip), or sheets. When the reinforcing fibres are continuous, their assembly constitutes a fabric or a nonwoven material (NCF). When the fibres are short, their assembly constitutes a felt or a nonwoven material.

Such pre-impregnated fibrous materials are especially intended for the production of lightweight composite materials for the manufacture of mechanical parts having a three-dimensional structure and good mechanical and thermal properties. When the fibres are carbon or resin is loaded with suitable additives, these fibrous materials are able to evacuate electrostatic charges. They therefore have properties compatible with the manufacture of parts in particular in the fields of mechanics, civil or military aeronautics, and nautical, automotive, oil and gas, particularly offshore, storage gas, energy, health and medical, army and armaments, sports and recreation, and electronics.

Such pre-impregnated fibrous materials are also referred to as composite materials. They comprise fibrous material, constituted by reinforcing fibres, and a matrix made up of impregnating polymer. The primary role of this matrix is to maintain the reinforcing fibres in a compact form and to give the desired shape to the final product. This matrix also ensures charge transfer between the fibres and therefore, conditions the mechanical strength of the composite. Such a matrix also serves to protect the reinforcing fibres against abrasion and an aggressive environment, to monitor the surface appearance and to disperse any fillers between the fibres. The role of this matrix is important for the long-term behaviour of the composite material, particularly with regard to fatigue and creep.

PRIOR ART

A good quality of the three-dimensional composite parts manufactured from pre-impregnated fibrous materials passes in particular through monitoring of the process of impregnating reinforcing fibres with thermoplastic polymer.

In the present description, the term "strip" is used to designate strips of fibrous material the width of which is greater than or equal to 400 mm. The term "ribbon" is used to designate ribbons of calibrated width and below or equal to 400 mm.

The term "roving" is also used to refer to the fibrous material.

Until now, the manufacture of strips of fibrous materials reinforced by impregnation of thermoplastic polymer or thermosetting polymer was carried out according to several processes which depend in particular, on the nature of the polymer, the type of final desired composite material and its range of applications. Powder impregnation or extrusion technologies on molten polymer crosshead are often used to impregnate reinforcing fibres with thermosetting polymers, like epoxy resins, for example, as described in patent WO2012/066241A2. These technologies are not generally directly applicable to impregnation with thermoplastic polymers, especially those with a high glass transition temperature, which have a melt viscosity too high to obtain satisfactory impregnation of fibres and semi-finished or good quality finished products.

Another known impregnation method is the continuous passage of fibres in an aqueous dispersion of polymer powder or aqueous dispersion of polymer particles or emulsion or aqueous polymer suspension. For example, reference can be made to EP0324680. In this process, a dispersion of micrometric size powders (approximately 20 µm) is used. After soaking in the aqueous solution, the fibres are impregnated with the polymer powder. The process then involves a drying step of passing the impregnated fibres through a first furnace to evaporate the water absorbed during soaking. A heat treatment step of passing the impregnated and dried fibres into a second heating zone at high temperature is then required to melt the polymer to adhere, disperse and coat the fibres.

The main disadvantage of this method is the homogeneity of the deposit which is sometimes imperfect. Another problem with this process is the drying time and energy consumption which strongly impacts production cost. In addition, the particle size of the powders generally used is fine (typically 20 µm of D50 by volume) and this also increases the final cost of the pre-impregnated ribbon or sheet.

Furthermore, the drying step of this method induces porosity in the pre-impregnated fibres by water evaporation.

The pre-impregnated fibrous material then needs to be shaped into ribbons for example.

Companies market strips of fibrous materials obtained by a method of impregnating unidirectional fibres by continuously passing the fibres in a thermoplastic polymer melt containing an organic solvent such as benzophenone. For example, reference can be made to U.S. Pat. No. 4,541,884 on Imperial Chemical Industries. The presence of the organic solvent makes it possible in particular to adapt the viscosity of the molten mixture and to ensure a good coating of the fibres. The fibres thus pre-impregnated are then shaped. They can for example, be cut into strips of different widths and then placed under a press, then heated to a temperature above the melting temperature of the polymer to ensure material cohesion and, in particular, adhesion of the polymer to the fibres. This impregnation and shaping method facilitate the production of structural parts with high mechanical strength.

One of the drawbacks of this technique lies in the heating temperature required to obtain these materials. The melting temperature of the polymers depends in particular on their chemical nature. It can be relatively high for poly (methyl methacrylate) (PMMA) polymers, or even very high for poly(phenylene sulphide) (PPS), poly (ether ether ketone) (PEEK) or poly (ether ketone ketone) (PEKK) for example. The heating temperature can therefore rise to temperatures higher than 250° C., and even higher than 350° C., temperatures higher than the boiling point and the flash point of the solvent, which are respectively 305° C. and 150° C. for benzophenone. In this case, there is a sudden departure of the solvent inducing a high porosity within the fibres and therefore causing the appearance of defects in the composite material. The process is therefore difficult to reproduce and involves explosion risks endangering the operators. Finally, the use of organic solvents is to be avoided for environmental and health and safety reasons.

Document EP 0 406 067, filed under the joint names of Atochem and the French State, as well as document EP0 201 367 describe a technique for impregnating a fluidised bed of polymer powder. The fibres penetrate into a closed fluidisation tank where, with regard to EP 0 406 067, they are optionally separated from each other through rollers or corrugated rolls, the fibres being electrostatically charged by friction in contact with these rollers or cylinders. This electrostatic charge allows the polymer powder to stick to the surface of the fibres and thus impregnate them.

The international application WO 2016/062896 describes roving powder coating by an electrostatic process in voluntary charge, by grounding the roving and applying a potential difference between the tip of the gun (s) or powder coating nozzles and the roving.

Document WO2008/135663 describes, in a third variant, the production of an impregnated fibre ribbon. In this document, the fibre ribbon is already preformed prior to the impregnation step, in the form of a fibre ribbon held together by means of retention. The ribbon thus preformed is pre-charged with static electricity and immersed in an enclosure containing a fluidised bed of fine polymer particles suspended in compressed air, in order to coat the ribbon with a layer of polymer coating. Such a document does not facilitate the impregnation of one or more fibre rovings and a continuous shaping of the pre-impregnated rovings in the form of one or more unidirectional parallel ribbons.

Document EP2586585 equally describes the principle of impregnating fibres by passing them into a fluidised bed of polymer particles. However, it does not describe a continuous shaping of one or more rovings thus impregnated, in the form of one or more unidirectional parallel ribbons.

Patent application US 2002/0197397 describes a process for impregnating fibres with a mixture of polymer powders, said mixing being carried out directly in a fluidised bed without prior compounding.

International patent application WO 2015/121583 describes a method of manufacturing a fibrous material pre-impregnated by impregnation of said material in a fluidised bed and hot calendering of said roving.

Hot calendering is carried out downstream of the impregnation device and makes it possible to homogenize polymer distribution and the impregnation of the fibres. The porosity obtained is controlled and reproducible but not quantified.

International patent application WO 2012/164014 describes a process for impregnating a polymer matrix that can be thermoplastic or thermodurable with a powder.

After impregnation, the strip is heated, then each face is covered with a nonwoven polymer fibre by heating.

The D90/D10 ratio is provided only in the context of the use of thermoset resin.

French patent FR 2600585 discloses a process for pre-impregnating fluidised bed rovings of glass fibre, carbon fibre, Kevlar the fibre diameter of which is between 5 and 10 microns, with initial spreading of said roving with a roller to separate the fibres then passage of said spread roving in a fluidised bed and composed of plastic particles the average diameter of which is within the limits corresponding to the diameter of the filaments.

Article by Miller et al.: "Impregnation techniques for thermoplastic matrix composites" (Polymers and Polymer Composites, Rapra Technology, Vol. 4, No 7, Jan. 1, 1996, pages 459-481) describes various processes for pre-impregnating rovings, in particular in a fluidised bed using polymer in powder form, without mention of the residence time of the roving in the powder, nor the volume diameter D50 of the powder particles.

Document EP0335186 describes the possibility of using a calender or a press for compacting a composite comprising pre-impregnated metal fibres, used for the manufacture of moulded bodies for electromagnetic radiation protection. It does not disclose impregnating one or more fibre rovings and continuously shaping them into one or more unidirectional parallel ribbons by hot calendering.

The shaping of pre-impregnated fibrous materials in the form of calibrated strips, suitable for the manufacture of three-dimensional composite parts by automatic removal using a robot, is generally carried out in post-processing.

Thus, document WO92/20521 describes the possibility of impregnating a roving of fibres by passing it through a fluidised bed of particles of thermoplastic powder. The fibres thus coated with polymer particles are heated in an oven or heater in order for the polymer to penetrate well and cover the fibres. Post-treatment of the obtained pre-impregnated fibrous reinforcement can be done by passing it through a polishing roller set to improving the impregnation with the still liquid matrix.

One or more superposed fibrous reinforcements can also be placed between two rollers to form a strip. Such a document does not make it possible to impregnate one or more fibre rovings and a continuous shaping of the pre-impregnated rovings in the form of one or more unidirectional parallel ribbons.

The quality of the ribbons of pre-impregnated fibrous material, and hence the quality of the final composite material, depends not only on the homogeneity of the impregnation of the fibres and therefore on the control and reproducibility of the porosity of the pre-impregnated fibrous material, but also the size and more particularly the width and thickness of the final ribbons. Regularity and control of these two dimensional parameters improving the mechanical strength of the materials.

Currently, regardless of the process used for the impregnation of fibrous materials, the manufacture of small width ribbons, meaning less than 400 mm width, generally requires a slitting (meaning cutting) of widths greater than 400 mm, also called sheets. The ribbons thus dimensioned are then taken back to be deposited by a robot using a head.

Furthermore, the sheet rolls not exceeding 1 km in length, ribbons obtained after cutting are generally not long enough to manufacture some large composite parts during removal by robot. The ribbons must therefore be flanked to obtain a longer length, creating extra thicknesses. These extra thicknesses lead to the appearance of heterogeneities that are detrimental to obtaining good quality composite materials constituting said composite parts.

In addition, these extra thicknesses require a machine downtime and robot restart and thus loss of time and productivity.

Current techniques for impregnating fibrous materials and shaping such fibrous materials pre-impregnated in the form of calibrated ribbons therefore have several disadvantages. For example, it is difficult to homogeneously heat a molten mixture of thermoplastic polymers in a die and at the die outlet to the core of the material, which alters the impregnation quality. In addition, the difference in existing temperature between the fibres and a molten mixture of polymers at the level of the impregnation die also alters the quality and homogeneity of the impregnation. Furthermore, this mode of impregnation melt does not make it possible to obtain high fibre contents or high production speeds due to the high viscosity of thermoplastic resins, especially when they have high glass transition temperatures, which is necessary for obtaining high performance composite materials. The use of organic solvents usually involves the appearance of defects in the material as well as environmental, health and safety risks in general. The shaping, by high-temperature post-treatment of the pre-impregnated fibrous material in the form of strips, remains difficult because it does not always facilitate a homogeneous distribution of the polymer within the fibres, which leads to obtaining a lower quality material with poorly controlled porosity. The slitting of sheets for obtaining calibrated ribbons and the splicing of these ribbons induces an additional manufacture cost. The slitting also generates significant dust problems that pollute the ribbons of pre-impregnated fibrous materials used for robot removal and can cause malfunctions of the robots and/or imperfections on the composites. This potentially leads to robot repair costs, production shut-down and the scrapping of non-compliant products. Finally, during the slitting step, a significant amount of fibres is deteriorated, inducing loss of properties, and in particular a reduction of the mechanical strength and conductivity, of ribbons of pre-impregnated fibrous material.

Furthermore, the impregnation does not always take place at the centre and if said above-cited documents indicate a thorough impregnation, the porosity obtained turns out too high, especially for the above-listed applications.

TECHNICAL PROBLEM

The invention therefore aims at remedying at least one of the disadvantages of the prior art. The invention aims in particular at proposing a manufacturing method of a pre-impregnated fibrous material, by an impregnation technique associating a control of the residence time in the impregnating device to the control of the spreading of said fibrous material at said device, and to obtain a pre-impregnated fibrous material exhibiting impregnation of fibres, especially at the core, and controlled dimensions, with a reduced, controlled and reproducible porosity on which the performance of the final composite part depends.

BRIEF DESCRIPTION OF THE INVENTION

In this regard, the subject of the invention is a process for manufacturing a pre-impregnated fibrous material comprising a fibrous material made of continuous fibres and at least one thermoplastic polymer matrix, comprising an impregnation step, particularly at the core, of said fibrous material in the form of a roving or several parallel rovings with at least one thermoplastic polymer matrix present in the form of a powder.

The invention also relates to a unidirectional ribbon of pre-impregnated fibrous material, in particular, ribbon wound on a reel, characterized in that it is obtained by a method as defined above.

The invention further relates to a use of the ribbon as defined above in the manufacture of three-dimensional parts. Said manufacture of said composite parts concerns the fields of transport, in particular automobile, oil and gas, especially offshore, gas storage, civil or military aeronautics, nautical, railway; renewable energy, in particular wind turbine, tidal turbine, energy storage devices, solar panels; thermal protection panels; sports and recreation, health and medical, ballistics with weapon or missile parts, security and electronics.

The invention also relates to a three-dimensional composite part, characterized in that it results from the use of at least one unidirectional ribbon of pre-impregnated fibrous material as defined above.

DETAILED DESCRIPTION OF THE INVENTION

The invention provides a process for manufacturing a pre-impregnated fibrous material comprising a fibre material made of continuous fibres and at least one thermoplastic polymer matrix, characterized in that said pre-impregnated fibrous material is made of a single unidirectional ribbon or in a plurality of unidirectional parallel ribbons and in that said method comprises an impregnation step, in particular at the core, of said fibrous material in the form of a roving or of several parallel rovings by said thermoplastic polymer in powder form, said impregnation step being carried out with said at least one thermoplastic polymer and said fibrous material the D90/D10 ratio of which by volume of the thermoplastic polymer particles ranges from 1.5 to 50, in particular from 2 to 10 and the ratio of the mean volume diameter (D50) of the thermoplastic polymer particles to the average diameter unit fibres of said fibrous material range from 3 to 40, except for an aqueous suspension impregnation process of a fibrous material made of carbon fibres by a thermoplastic polymer in which said D50/average diameter of unit fibres ratio is between 3 to 8, and excluding any electrostatic process in voluntary charge.

The inventors have unexpectedly found that, on the one hand, control of the residence time in powder facilitates the impregnation of fibrous material with thermoplastic polymer matrix, in particular at the core with a well-controlled powder (resin) ratio and on the other hand, below a D50 of 25 μm, the size of the particles is too small to be fluidised or correctly projected, in particular by gun (s) or powder-coating nozzle (s) at a roller inlet, which leads to a poor implementation and therefore poor impregnation.

Polymer Matrix

Thermoplastic, or thermoplastic polymer, is understood to mean a material that is generally solid at ambient temperature, that can be semi-crystalline or amorphous, and that softens during an increase in temperature, especially after passing its glass transition temperature (Tg). and flows at a higher temperature when it is amorphous, or can present a pure fusion at the passage of its melting temperature (Tf) when it is semi-crystalline, and which becomes solid again during a decrease in temperature below its crystallization temperature (for semi-crystalline) and below its glass transition temperature (for amorphous).

Tg and Tf are determined by differential scanning calorimetry (DSC) according to 11357-2: 2013 and 11357-3: 2013 standards respectively.

The polymer constituting the impregnating matrix of the fibrous material, is advantageously a thermoplastic polymer or a mixture of thermoplastic polymers. This polymer or mixture of thermoplastic polymers is crushed in powder form so that it can be used in a device such as a tank, especially in a fluidised bed.

The device in the form of a tank, in particular in a fluidised bed, can be open or closed.

Optionally, the thermoplastic polymer or thermoplastic polymer blend further comprises carbonaceous fillers, in particular carbon black or carbon nanofillers, preferably selected from carbon nanofillers, in particular graphenes and/or carbon nanotubes and or carbon nanofibrils or mixtures thereof. These charges facilitate the conduction of electricity and heat, and consequently improving the lubrication of the polymer matrix when it is heated.

Optionally, said thermoplastic polymer comprises at least one additive, especially selected from a catalyst, an antioxidant, a thermal stabilizer, a UV stabilizer, a light stabilizer, a lubricant, a filler, a plasticizer, a flame retardant, a nucleating agent, a chain extender and a dye or a mixture thereof.

According to another variant, the thermoplastic polymer or thermoplastic polymer blend can further comprise liquid crystal polymers or cyclised poly(butylene terephthalate), or mixtures containing them, such as the CBT100 resin marketed by CYCLICS CORPORATION. These compounds facilitate especially the fluidisation of the polymer matrix in molten state, for better penetration into the core of the fibres. Depending on the nature of the polymer, or mixture of thermoplastic polymers used to make the impregnation matrix, in particular its melting temperature, one or other of these compounds will be chosen.

The thermoplastic polymers forming part of the impregnation matrix of the fibrous material can be selected from:
- polymers and copolymers of the family of aliphatic, cycloaliphatic polyamides (PA) or semi-aromatic PAs (also known as polyphthalamides (PPAs)),
- polyureas, in particular aromatic,
- polymers and copolymers of the family of acrylics such as polyacrylates, and more particularly polymethyl methacrylate (PMMA) or its derivatives
- polymers and copolymers of the family of polyaryletherketones (PAEK) such as polyetheretherketone (PEEK), or polyaryletherketone ketones (PAEKK) such as polyetherketone ketones (PEKK) or their derivatives,
- aromatic polyether-imides (PEI),
- polyarylsulphides, especially polyphenylene sulphides (PPS),
- polyarylsulphones, especially polyphenylene sulphones (PPSU),
- Polyolefins, especially polypropylene (PP);
- polylactic acid (PLA),
- polyvinyl alcohol (PVA),
- fluorinated polymers, especially polyvinylidene fluoride (PVDF), or polytetrafluoroethylene (PTFE) or polychlorotrifluoroethylene (PCTFE), and mixtures thereof.

Advantageously, when said thermoplastic polymer is in a mixture, it is added to the tank in powder form previously obtained by "dry blend" or compound or directly into the tank in the form of "dry blend".

Advantageously, it is added in powder form previously obtained by "dry blend" or directly into the tank in the form of "dry blend" and the mixture is a mixture of PEKK and PEI.

Advantageously, when said polymer is a mixture of two polymers P1 and P2, the proportion by weight of polymer P1 and P2 ranges from 1-99% to 99-1%.

Advantageously, the PEKK/PEI mixture ranges from 90-10% to 60-40% by weight, in particular from 90-10% to 70-30% by weight.

The thermoplastic polymer can be the non-reactive final polymer that will impregnate the fibrous material or a reactive prepolymer, which will also impregnate the fibrous material, but is capable of reacting on its own or with another prepolymer, depending on the end of the chain carried by said prepolymer, after impregnation, or with a chain extender and in particular during heating at a heating calender.

According to a first possibility, said prepolymer can comprise or consist of at least one reactive (polyamide) prepolymer carrying on the same chain (i.e. on the same prepolymer), two terminal functions X' and Y' functions respectively coreactive with each other by condensation, more particularly with X' and Y' being amine and carboxy or carboxy and amine respectively. According to a second possibility, said prepolymer can comprise or consist of at least two polyamide prepolymers which are inter reactive and each carrying two identical terminal functions X' or Y' (identical for the same prepolymer and different between the two prepolymers), said function X' of a prepolymer that can react only with said function Y' of the other prepolymer, in particular by condensation, more particularly with X' and Y' being amine and carboxy or carboxy and amine respectively.

According to a third possibility, said prepolymer can comprise or consist of at least one prepolymer of said thermoplastic polyamide polymer carrying n terminal reactive functions X, selected from: —NH2, —CO2H and —OH, preferably NH2 and —CO2H with n being 1 to 3, preferably 1 to 2, more preferably 1 or 2, more particularly 2 and at least one chain extender Y-A'-Y, with A' being a hydrocarbon biradical, of non-polymeric structure, carrying 2 identical terminal reactive functions Y, reactive by polyaddition with at least one function X of said prepolymer a1), preferably of molecular mass less than 500, more preferably less than 400.

The number-average molecular mass Mn of said final polymer of the thermoplastic matrix is preferably in a range from 10,000 to 40,000, preferably from 12,000 to 30,000. These Mn values can correspond to inherent viscosities greater than or equal to 0.8 as determined in m-cresol according to ISO 307: 2007 but replacing the solvent (use of m-cresol in place of sulphuric acid and the temperature being 20° C.).

Said reactive prepolymers according to the two options mentioned above, have a number-average molecular mass Mn ranging from 500 to 10,000, preferably from 1,000 to 6,000, especially from 2,500 to 6,000.

Mn values are determined in particular by the calculation from the terminal functions rates determined by potentiometric titration in solution and the functionality of said prepolymers. Mn masses can also be determined by size exclusion chromatography or by NMR.

The nomenclature used to define polyamides is described in ISO 1874-1:2011 "Plastics—Polyamide (PA) Materials for Moulding and Extrusion—Part 1: Designation", especially on page 3 (tables 1 and 2) and is well known to the person skilled in the art.

The polyamide can be a homopolyamide or a copolyamide or a mixture thereof.

Advantageously, the polymers constituting the matrix are selected from polyamides (PA), particularly selected from aliphatic polyamides, especially PA11 and PA12, cycloaliphatic polyamides, and semi-aromatic polyamides (polyphthalamides) optionally modified with urea units, and copolymers thereof, polymethyl methacrylate (PPMA) and copolymers thereof, polyetherimides (PEI), polyphenylene sulphide (PPS), polyphenylene sulfone (PPSU), polyetherketoneketone (PEKK), polyetheretherketone (PEEK), fluorinated polymers such as polyvinylidene fluoride (PVDF).

For fluoropolymers, a homopolymer of vinylidene fluoride (VDF of formula $CH_2=CF_2$) or a VDF copolymer comprising at least 50% by weight of VDF and at least one other monomer copolymerisable with VDF. The VDF content must be greater than 80% by weight, or even better 90% by weight, to ensure good mechanical strength to the structural part, especially when subjected to thermal and chemical stresses. The comonomer can be a fluorinated monomer for example, vinyl fluoride.

For structural parts that must withstand high temperatures, in addition to the fluorinated polymers, PAEK (PolyArylEtherKetone) such as polyether ketones PEK, polyether ether ketone PEEK, polyether ketone ketone PEKK, polyether ether ketone ether ketone ketone PEKEKK or high temperature glass transition PAs Tg) are advantageously used according to the invention.

Advantageously, said thermoplastic polymer is a polymer the glass transition temperature of which is such that Tg≥80° C. or a semicrystalline polymer the melting temperature of which Tf≥150° C.

Advantageously, said thermoplastic polymer is:

an aliphatic polyamide selected from polyamide 6 (PA-6), polyamide 11 (PA-11), polyamide 12 (PA-12), polyamide 66 (PA-66), polyamide 46 (PA-46) polyamide 610 (PA-610), polyamide 612 (PA-612), polyamide 1010 (PA-1010), polyamide 1012 (PA-1012), or a mixture thereof or a copolyamide thereof, a semi-aromatic polyamide, optionally modified with urea units, in particular a semi-aromatic polyamide of formula X/YAr, as described in EP1505099, including a semi-aromatic polyamide of formula A/XT wherein A is selected from a unit obtained from an amino acid, a unit obtained from a lactam and a unit with the formula (Ca diamine). (Cb diacide), where a represents the number of carbon atoms of the diamine and b represents the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the (Cb diacid) unit being selected from linear or branched aliphatic diacids, cycloaliphatic diacids and aromatic diacids;

XT denotes a unit obtained from the polycondensation of a diamine in Cx and terephthalic acid, with x representing the number of carbon atoms of the diamine in Cx, x being between 6 and 36, advantageously between 9 and 18, in particular a polyamide of formula A/6T, A/9T, A/10T or A/11T, A being as defined above, in particular a polyamide PA 6/6T, 66/6T, 6I/6T, MPMDT/6T, PA11/10T, 11/6T/10T, MXDT/10T or MPMDT/10T, BACT/10T, MXD6 and MXD10 and block copolymers, especially polyamide/polyether (PEBA).

T is terephthalic acid, MXD is m-xylylene diamine, MPMD is methylpentamethylene diamine, and BAC is bis(aminomethyl) cyclohexane.

Fibrous Material:

As regards the fibres of constitution of said fibrous material, they are in particular, fibres of mineral, organic or vegetable origin. Fibres of mineral origin, can include carbon fibres, glass fibres, basalt fibres, silica fibres, or silicon carbide fibres, for example. Fibres of organic origin, can include thermoplastic or thermosetting polymer-based fibres, such as semi-aromatic polyamide fibres, aramid fibres or polyolefin fibres, for example. Preferably, they are based on amorphous thermoplastic polymer and have a glass transition temperature Tg greater than the Tg of the polymer or thermoplastic polymer mixture of constitution of the impregnation matrix when the latter is amorphous, or greater than the Tf of the thermoplastic polymer or mixture of impregnation matrix constitution when the latter issemicrystalline. Advantageously, they are based on semicrystalline thermoplastic polymer and have a melting temperature Tf greater than the Tg of the polymer or thermoplastic polymer mixture of constitution of the impregnation matrix when the latter is amorphous, or greater than the Tf of the thermoplastic polymer or mixture of impregnation matrix constitution when the latter issemicrystalline. Thus, there is no risk of fusion for the organic fibres constituting the fibrous material during impregnation with the thermoplastic matrix of the final composite. Fibres of vegetable origin, can include natural fibres based on flax, hemp, lignin, bamboo, silk, especially spider, sisal, and other cellulosic fibres, in particular viscose fibres. These plant-based fibres can be used pure, treated or coated with a coating layer, in order to facilitate the adhesion and impregnation of the thermoplastic polymer matrix.

The fibrous material can also be a fabric, braided or woven with fibres.

It can also correspond to fibres with retaining threads.

These constituent fibres can be used alone or in mixtures. Thus, organic fibres can be mixed with mineral fibres to be impregnated with thermoplastic polymer and form the pre-impregnated fibrous material.

Organic fibre rovings can have several weights. They can also have several geometries. The fibres can be in the form of short fibres, which then compose the felts or nonwoven fabrics which can be in the form of strips, sheets, or pieces, or in the form of continuous fibres, which make up the 2D fabrics, braids or unidirectional (UD) or nonwoven fibres. The fibres constituting fibrous material can also be in the form of a mixture of these reinforcing fibres of different geometries. Preferably, the fibres are continuous.

Preferably the fibrous material is constituted by continuous fibres of carbon, glass or silicon carbide or their mixture, in particular carbon fibres. It is used in the form of a roving or several rovings.

Advantageously, said fibrous material is made of glass fibres and said D50/average diameter of unit fibres ratio ranges from 3 to 15, in particular from 3 to 10.

In particular, said fibrous material is made of glass fibres and said D50/average diameter of unit fibres ratio ranges from 4 to 15, in particular from 4 to 10.

Advantageously, said fibrous material is composed of carbon fibres and said D50/average diameter of the unit fibres ratio ranges from 10 to 40.

In pre-impregnated materials also known as "ready-to-use" materials, the polymer or mixture of thermoplastic impregnating polymers is uniformly and homogeneously distributed around the fibres. In this type of material, the thermoplastic impregnating polymer must be distributed as homogeneously as possible within the fibres in order to obtain a minimum of porosities, i.e. a minimum of voids between the fibres. Indeed, the presence of porosities in this type of material can act as stress concentration points, during a mechanical tensile stress for example, and which then form fracture initiation points of the pre-impregnated fibrous material and weakens it mechanically. A homogeneous distribution of the polymer or polymer mixture thus improvings the mechanical strength and homogeneity of the composite material formed from these pre-impregnated fibrous materials.

Thus, in the case of "ready-to-use" pre-impregnated materials, the content of fibres in said impregnated fibrous material is 45 to 65% by volume, preferably 50 to 60% by volume, especially 54 to 60% by volume.

The measurement of the impregnation rate can be carried out by image analysis (use of microscope or camera or digital camera, in particular), a cross section of the ribbon, by dividing the surface of the ribbon impregnated with the polymer by the total surface of the product (impregnated surface plus porous surface). In order to obtain a good quality image, it is preferable to coat the ribbon cut in its transversal direction in a standard polishing resin and to polish with a standard protocol enabling observation of the sample under a microscope minimum 6 magnification.

Advantageously, the porosity rate of said pre-impregnated fibrous material is between 0% and 30%, especially from 1% to 10%, in particular from 1% to 5%.

The porosity rate corresponds to the closed porosity rate and can be determined either by electron microscopy or as being the relative difference between the theoretical density and the experimental density of said pre-impregnated fibrous material as described in the examples section of the invention.

Impregnation Stage:

Said impregnation step is carried out by powder deposition, fluidisation bed, by continuous passage of the fibres in an aqueous dispersion or by spraying by with spray gun (s) or powdering nozzle (s) at the roll inlet.

Advantageously, it is carried out by fluidised bed in an impregnation tank.

An exemplary unit for implementing the fluidised bed manufacturing method in an impregnation tank is described in international patent application WO 2015/121583 and is represented in FIG. 1, with the exception of the tank (otherwise called impregnation tank which in the case of the invention comprises a fluidised bed provided with a tension device (FIG. 3) which can be a compression roller (FIG. 4).

The compression roller can be fixed or rotatable.

The impregnation step of the fibrous material is carried out by passing one or more rovings in a continuous impregnation device, comprising a tank (20), comprising in particular a fluidised bed (22) of polymer powder.

The polymer (s) or polymer powder is suspended in a gas G (air for example) introduced into the tank and circulating in the tank through a hopper 21. The roving or rovings are circulated in this fluidised bed 22.

The tank can have any shape, especially cylindrical or parallelepiped, in particular a rectangular parallelepiped or a cube, advantageously a rectangular parallelepiped.

The tank can be an open or closed tank. Advantageously, it is open.

In the case where the tank is closed, it is then equipped with a sealing system to prevent the polymer powder from getting out of said tank.

This impregnation step is therefore carried out dry, meaning the thermoplastic polymer matrix is in powder form, in particular suspended in a gas, especially air, but cannot be dispersed in a solvent or in water.

Each roving to be impregnated is unwound from a device (10) reels (11) under traction generated by cylinders (not shown). Preferably, the device (10) comprises a plurality of reels (11), each reel for unwinding a roving for impregnation. Thus, it is possible to impregnate several fibre rovings simultaneously. Each reel (11) is provided with a brake (not shown) in order to apply tension to each fibre roving. In this case, an alignment module (12) makes it possible to arrange the fibre rovings parallel to one another. In this way the fibre rovings cannot be in contact with each other, which helps prevent mechanical degradation of the fibres by friction between them.

The fibre roving or the parallel fibre rovings then pass into a tank (20), in particular comprising a fluidised bed (22), provided with a tension device which is a compression roller (23) in the case of FIG. 1. The fibre roving or the parallel fibre rovings then spring out of the tank after impregnation upon control of the residence time in powder.

The inventors have therefore unexpectedly found that the control of the residence time in powder enabled the impregnation the fibrous material with thermoplastic polymer matrix, with a well-controlled resin content.

They also found that through the use of at least one tension device impregnation was improvingd compared to the methods of the prior art, in particular, impregnation is at core.

Tension device refers to any system on which the roving has the ability to scroll in the tank. The tension device can have any shape from the moment the roving can scroll on.

An example of a tension device, without limiting the scope of the invention, is detailed in FIG. 3.

This impregnation is carried out in order to allow the polymer powder to penetrate the core of the fibre roving and adhere to the fibres sufficiently enough to support the transport of the powdered roving out of the tank. The rovings pre-impregnated with powder, is (are) directed (s) then to a heating calendering device, with possibility of preheating before calendering and optional heating post-calendering.

Optionally, this impregnation step can be completed by a step of coating the impregnated roving or rovings just at the outlet of the fluidised bed powder (20) impregnation tank (22), and just before the calendering shaping step. For this purpose, the discharge hatch of the tank (20) (fluidised bed 22) can be connected to a coating device (30) which can comprise a cover crosshead, as is also described in patent EP0406067. The overlay polymer can be the same or different from the fluidised bed polymer powder. Preferably, it is of the same nature. Such a coating not only facilitates the completion of the fibre impregnation stage to obtain a final polymer volume rate in the desired range and to avoid the presence on the surface of the pre-impregnated roving, of an excessively high fibre content, which would interfere with the tap welding during the manufacture of the composite part, especially obtaining "ready to use" good quality fibrous materials, but also to improving the performance of the composite material obtained.

The process of the invention as indicated above is carried out by the dry method, excluding an electrostatic process in voluntary charge.

The expression "in voluntary charge" means a potential difference is applied between the fibrous material and the powder. The charge is notably controlled and amplified. The powder grains then impregnate the fibrous material by attracting the charged powder opposite the fibre. The powder can be electrically charged, negatively or positively, by different means (potential difference between two metal electrodes, mechanical friction on metal parts, etc.) and charge the fibre inversely (positively or negatively).

The process of the invention does not exclude the presence of electrostatic charges which can appear by friction of the fibrous material on the implementation unit elements before or at the level of the tank but which are in any case involuntary charges.

Advantageously, the content of fibres in said impregnated fibrous material is 45 to 65% by volume, preferably 50 to 60% by volume, in particular 54 to 60% by volume.

Below 45% of fibres, reinforcement is not necessary in terms of mechanical properties.

Above 65%, the process limits are reached and the mechanical properties are lost.

If the fibrous material, such as fibreglass, has a sizing, an optional de-sizing step can be performed before the fibrous material passes into the tank. The term "sizing" refers to the surface treatments applied to the reinforcing fibres at the end of the die (textile size) and on the fabrics (plastic sizing).

The "textile" size applied to the filaments at the outlet of the die consists in depositing a bonding agent ensuring the cohesion of the filaments between them, reducing the abrasion and facilitating the subsequent manipulations (weaving, draping, knitting) and preventing the formation of electrostatic charges.

The "plastic" or "finish" size applied to the fabrics consists in depositing a bridging agent the roles of which are to ensure a physical-chemical bond between the fibres and the resin and to protect the fibre from its environment.

Advantageously, the content of fibres in said impregnated fibrous material range from 50 to 60%, in particular from 54 to 60% by volume.

Advantageously, the residence time in the powder range from 0.01 s to 10 s, preferably from 0.1 s to 5 s, and in particular from 0.1 s to 3 s.

The residence time of the fibrous material in the powder is essential for the impregnation, especially at the core, of said fibrous material.

Below 0.1 s, the impregnation is not good at core.

Beyond 10 s, the content of polymer matrix impregnating the fibrous material is too high and the mechanical properties of the pre-impregnated fibrous material will be poor.

Advantageously, the tank used in the process of the invention comprises a fluidised bed and said impregnation stage is carried out with simultaneous spreading of said roving (s) between the inlet and the outlet of said fluidised bed.

The expression "fluidised bed inlet" corresponds to the vertical tangent of the edge of the tank comprising the fluidised bed.

The expression "outlet of the fluidised bed" corresponds to the vertical tangent of the other edge of the tank which comprises the fluidised bed.

Depending on the geometry of the tank, the distance between the inlet and the outlet of the tank corresponds to the diameter in the case of the cylinder, to the side in the case of a cube or to the width or length in the case of a parallelepiped rectangular. Spreading consists in singling out as much as possible, each constituent filament of said roving from the other filaments closely surrounding it. It corresponds to the transverse spreading of the roving.

In other words, the transverse spreading or the width of the roving increases between the inlet of the fluidised bed (or of the tank comprising the fluidised bed) and the outlet of the fluidised bed (or of the tank comprising the fluidised bed) and thus allows improvingd impregnation, especially at the core of the fibrous material.

The fluidised bed can be open or closed, in particular it is open.

Advantageously, the fluidised bed comprises at least one tension device, said roving or said rovings being in contact with part or the entire surface of said at least one tension device.

FIG. 3 details a tank (20) comprising a fluidised bed (22) with a height-adjustable, height-adjustable tension device (82).

The roving (81*a*) corresponds to the roving before impregnation which is in contact with part or the entire surface of said at least one tension device and thus scrolls partially or completely on the surface of the tension device (82), said system (82) being immersed in the fluidised bed where the impregnation takes place. Said roving then leaves the tank (81*b*) after controlling the residence time in powder.

Said roving (81*a*) may or may not be in contact with the edge of the tank (83*a*) which can be a rotating or fixed roller or a parallelepiped edge.

Advantageously, said roving (81*a*) is in contact or not with the edge of the tank (83*a*).

Advantageously, the edge of the tank (83*b*) is a roller, in particular cylindrical and rotary.

Said roving (81*b*) may or may not be in contact with the edge of the tank (83*b*) which can be a roller, in particular a cylindrical and rotary or fixed roller, or a parallelepiped edge.

Advantageously, said roving (81*b*) is in contact with the edge of the tank (83*b*).

Advantageously, the edge of the tank (83*b*) is a roller, in particular cylindrical and rotary.

Advantageously, said roving (81*a*) is in contact with the edge of the tank (83*a*) and the edge of the tank (83*b*) is a roller, in particular cylindrical and rotating and said roving (81*b*) is in contact with the edge of the tank (83*b*), and the edge of the tank (83*b*) is a roller, in particular cylindrical and rotating.

Advantageously, said tension device is perpendicular to the direction of said roving or said rovings.

Advantageously, said spreading of said roving (s) is performed at least at said at least one tension device.

The spreading of the roving is therefore mainly at the level of the tension device but can also be performed at the edge or edges of the tank if there is contact between the roving and said edge.

In another embodiment, said at least one tension device is a convex, concave or cylindrical compression roller.

The convex form is favourable to spreading whereas the concave form is unfavourable to spreading although it is carried out regardless.

The expression "compression roller" means that the rolling roving sits partially or completely on the surface of said compression roller, which induces the spreading of said roving.

Advantageously, said at least one compression roller is cylindrical in shape and the spreading percentage of said roving or said rovings between the inlet and the outlet of said fluidised bed is between 1% and 400%, preferably between 30% and 400%. preferably between 30% and 150%, preferably between 50% and 150%.

The spreading depends on the fibrous material used. For example, the spreading of a carbon fibre material is much greater than that of a flax fibre.

The spreading also depends on the number of fibres or filaments in the roving, their average diameter and their cohesion by the size.

The diameter of said at least one compression roller ranges from 3 mm to 500 mm, preferably from 10 mm to 100 mm, in particular from 20 mm to 60 mm.

Below 3 mm, fibre deformation induced by compression roller is too high.

Advantageously, compression roller is cylindrical and not grooved and in particular is metallic.

When the tension device is at least one compression roller, according to a first variant, a single compression roller is present in the fluidised bed and said impregnation is performed at angle $\alpha_1$ formed by said roving (s) between the inlet of said compression roller and the vertical tangent to said compression roller.

The angle $\alpha_1$ formed by said roving (s) between the inlet of said compression roller and the vertical tangent to said compression roller enables the formation of an area wherein the powder will concentrate thus leading to a "wedge effect" which with the simultaneous spreading of the roving by said compression roller enables impregnation over a larger width of roving and thus improving impregnation compared to the techniques of the prior art. Coupling with the control of the residence time then allows a thorough impregnation.

Advantageously, angle $\alpha_1$ ranges from 0 to 89°, preferably 5° to 85°, preferably from 5° to 45°, preferably from 5° to 30°.

However, a 0 to 5° angle $\alpha_1$ is likely to generate risks of mechanical stress, which will lead to the breakage of the fibres and a 85° to 89° angle $\alpha_1$ does not generate enough mechanical force to create the "wedge effect".

A value of angle $\alpha_1$ 0° corresponds to a vertical fibre. It is obvious that the height of the cylindrical compression roller is adjustable thus facilitating the vertical positioning of the fibre.

It would not be outside the scope of the invention if the wall of the tank was pierced in order to enable the exit of the roving.

Advantageously, the edge of the tank (83a) is equipped with a roller, in particular cylindrical and rotary on which runs said roving(s) thus leading to a prior spreading.

Advantageously, one or more difficulties are present downstream of the tank comprising the fluidised bed at which spreading is initiated.

Advantageously, spreading is initiated at the said one or more of the aforementioned obstacles and continues at the edge of the tank (83a).

The spreading is then maximum after passage at compression roller or rollers.

FIG. 4 discloses an embodiment, but not limited thereto, to a single compression roller, with a tank (20) comprising a fluidised bed (22) wherein a single cylindrical compression roller is present and displaying angle $\alpha_1$.

The arrows on the fibre indicate the fibre scrolling direction.

Advantageously, the level of said powder in said fluidised bed is at least mid-height of said compression roller.

Evidently, the "corner effect" caused by angle $\alpha_1$ promotes impregnation on one side but the spreading of said roving obtained through compression roller also enables an impregnation on the other side of said roving. In other words, said impregnation is enabled on one surface of said roving (s) at angle $\alpha_1$ formed by said roving (s) between the inlet of said at least one compression roller $R_1$ and the vertical tangent to compression roller $R_1$ but the blossoming also enables the impregnation of the other surface.

Angle $\alpha_1$ is as defined above.

According to a second variant, when the tension device is at least one compression roller, then two compression rollers $R_1$ and $R_2$ are in said fluidised bed and said impregnation is performed at angle $\alpha_1$ formed by said roving (s) between the inlet of said compression roller $R_1$ and the vertical tangent to said compression roller $R_1$ and/or at angle $\alpha_2$ formed by said roving (s) between the inlet of said compression roller $R_2$ and the vertical tangent to said compression roller $R_2$, said compression roller $R_1$ preceding said compression roller $R_2$ and said roving or said roving being able to pass above (FIGS. 5 and 6) or below (FIGS. 7 and 8) of roller $R_2$.

Advantageously, the two compression rollers are of identical or different shape and selected from a convex, concave or cylindrical shape.

Advantageously, the two compression rollers are identical and cylindrical, non-corrugated and in particular metal.

The diameter of the two compression rollers can also be the same or different and is as defined above.

Advantageously, the diameter of the two compression rollers is identical.

The two compression rollers $R_1$ and $R_2$ can be at the same level relative to each other and relative to the bottom of the tank (FIGS. 6 and 7) or tilted relative to each other and relative to the bottom of the tank, the height R compression roller$_1$ being higher or lower than that of compression roller $R_2$ relative to the bottom of the tank (FIGS. 5 and 8).

Advantageously, when the two rollers are at different heights and the roving passes above the roller R2, then $\alpha_2$ ranges from 0 to 90°.

Advantageously, said impregnation is therefore performed at angle $\alpha_1$ formed by said roving (s) between the inlet of said compression roller $R_1$ and the vertical tangent to said compression roller on one surface of said roving and at angle $\alpha_2$ formed by said roving (s) between the inlet of said compression roller $R_2$ and the vertical tangent to said compression roller $R_2$ on the opposite side of said roving which is obtained by passing over roller $R_2$.

Advantageously, said roving in this embodiment is subject to spreading at each angle $\alpha_1$ and $\alpha_2$.

FIG. 6 describes an embodiment, without being limited thereto, with two compression rollers $R_1$ and $R_2$, $R_1$ preceding $R_2$, with a tank (20) comprising a fluidised bed (22) wherein the two cylindrical compression rollers, at the same level and side by side, are present and showing the case where said one or more rovings emerge between said compression rollers $R_1$ and $R_2$.

In this case, angle $\alpha_2$ is equal to 0 and said one or more rovings go over roller $R_2$.

The arrows on the fibre indicate the fibre scrolling direction.

In an alternative manner, said roving (s) scroll at input between said compression rollers $R_1$ and $R_2$ and emerge after being in contact with some or all of the surface of said compression roller $R_2$.

Advantageously, said roving (s) is (are) in contact with some or all of the surface of said compression roller $R_1$ and emerge outside compression roller $R_2$ after being in contact with some or all of the surface of said compression roller $R_2$ under roller $R_2$, angle $\alpha_2$ being formed by said roving (s) between the inlet of said compression roller $R_2$ and the vertical tangent to said compression roller $R_2$. In this case, angle $\alpha_2$=90°.

Advantageously, said impregnation is therefore performed at angle $\alpha_1$ formed by said roving(s) between the inlet of said compression roller $R_1$ and the vertical tangent to said compression roller on one surface of said roving and at angle $\alpha_2$ formed by said roving(s) between the inlet of said compression roller $R_2$ and the vertical tangent to said compression roller $R_2$ on the same side of said roving but the spreading also makes it possible to impregnate the other side.

Advantageously, said roving in this embodiment is subject to spreading at each angle $\alpha_1$ and $\alpha_2$.

FIG. 7 shows an example of an embodiment with two compression rollers $R_1$ and $R_2$ at the same level with each other.

According to another embodiment of the second variant, when two compression rollers are present, then the distance between the two compression rollers $R_1$ and $R_2$ is 0.15 mm to the length equivalent to the maximum dimension of the tank, preferably from 10 mm to 50 mm and the difference in height between the two compression rollers $R_1$ and $R_2$ is from 0 to the height corresponding to the maximum height of the tank subtracted from the diameters of the two compression rollers, preferably from 0.15 mm to the height corresponding to the maximum height of the tank subtracted from the diameters of the two compression rollers, more preferably at a difference in height of between 10 mm and 300 mm, $R_2$ being the upper compression roller.

Advantageously, when two compression rollers are present and at the same level relative to each other, the level of said powder in said fluidised bed is at least located at mid-height of said two compression rollers.

FIG. 8 describes an embodiment, without being limited thereto, to two compression rollers $R_1$ and $R_2$, $R_1$ preceding $R_2$, with a tank (20) comprising a fluidised bed (22) wherein two cylindrical compression rollers at different levels are present and displaying angle $\alpha_1$ and $\alpha_2$.

The diameter of compression rollers $R_1$ and $R_2$ is shown as identical in FIGS. 5, 6, 7 and 8 but the diameter of each cylindrical compression roller can be different, the diameter of compression roller $R_1$ can be greater or smaller than that of compression roller $R_2$ in the range as defined above.

Advantageously, the diameter of the two compression rollers is identical.

It would not be outside the scope of the invention if compression roller $R_1$ was higher than compression roller $R_2$.

According to a third variant, when two compression rollers are present and at different levels, then at least a third compression roller $R_3$ is additionally present and located between compression rollers $R_1$ and $R_2$ vertically (FIG. 9).

Advantageously said roving(s) is (are) in contact with some or all of the surface of said compression roller $R_1$ then with some or all of the surface of said compression roller $R_3$ and emerge after being in contact with some or all of the surface of said compression roller $R_2$.

Advantageously, said impregnation is performed on one surface of said roving(s) at angle $\alpha_1$ formed by said roving (s) between the inlet of said at least one compression roller $R_1$ and the vertical tangent to compression roller $R_1$ as well as at angle $\alpha_3$ formed by said roving(s) and the vertical tangent to compression roller $R_3$ and on the other side only at angle $\alpha_2$ formed by said roving(s) and the vertical tangent to compression roller $R_2$.

Advantageously, when two compression rollers are present at different levels and at least one third compression roller $R_3$ is more present, then angle $\alpha_2$ formed by said roving(s) between the inlet of said at least one compression roller $R_2$ and the vertical tangent to said compression roller $R_2$ ranges from 180° to 45°, in particular from 120° to 60°.

Advantageously, angle $\alpha_3$ ranges from 0° to 180°, preferably from 45° to 135°.

FIG. 9 describes an embodiment, without being limited thereto, with a tank (20) comprising a fluidised bed (22) with two compression rollers $R_1$ and $R_2$, $R_1$ preceding $R_2$, and a third compression roller $R_3$ and showing angles $\alpha_1$, $\alpha_2$ and $\alpha_3$.

The diameter of compression rollers $R_1$, $R_2$ and $R_3$ is shown as identical in FIG. 9 but the diameter of each cylindrical compression roller can be different, or two compression rollers can have the same diameter and the third a different diameter greater or less, in the range as defined above.

Advantageously, the diameter of the three compression rollers is identical.

Advantageously, in this third variant, a second spreading control of said roving(s) is performed at the level of compression roller $R_3$ and a third spreading control is performed at compression roller $R_3$.

The residence time in this third variant is as defined above.

Advantageously, in this third variant, the level of said powder in said fluidised bed is at least at mid-height of said compression roller $R_2$.

It would still be within the scope of the invention if in this third variant, said roving(s) is (are) in contact with some or all of the surface of said compression roller $R_1$ then with some or all of the surface of said compression roller $R_2$ and emerge after being in contact with some or all of the surface of said compression roller $R_3$.

According to another embodiment of the present invention, the tank used in the process of the invention does not have a fluidised bed but comprises a spray gun(s) or powder nozzle(s) of said powder at the roll inlet and said impregnation step is carried out with simultaneous spreading of said roving or said rovings between the inlet and the outlet of the tank.

In like manner as above, residence time in the fluidised bed of powder is controled and the tank can be provided with the same tension devices, in particular one or more compression rollers as defined above.

Advantageously, residence time in the tank range from 0.01 s to 10 s, preferably from 0.1 s to 5 s, and in particular from 0.1 s to 3 s.

According to an advantageous embodiment, the present invention relates to a method as defined above characterized in that a single thermoplastic polymer matrix is used and the thermoplastic polymer powder is fluidisable.

The term "fluidisable" means the air flow applied to the fluidised bed is between the minimum fluidisation flow rate (Umf) and the s (Umb) as shown in FIG. 17.

Below the minimum fluidisation velocity, there is no fluidisation, the polymer powder particles fall into the bed and are no longer in suspension and the method according to the invention cannot work.

Above the minimum bubbling flow rate, the powder particles vanish and the composition of the constant fluidised bed can no longer be kept constant.

Advantageously, the volume diameter D90 of the particles is between 50 and 500 μm, advantageously between 120 and 300 μm.

Advantageously, the volume diameter D10 of the particles is between 5 and 200 μm, advantageously between 35 and 100 μm.

Advantageously, the average volume diameter of the thermoplastic polymer powder particles is between 30 to 300 μm, in particular from 50 to 200 μm, more particularly from 70 to 200 μm.

The volume diameters of particles (D10, D50 and D90) are defined according to ISO 9276: 2014.

"D50" corresponds to the average diameter by volume, meaning the value of the particle size which divides the particle population examined in exactly two parts.

"D90" corresponds to the value at 90% of the cumulative curve of the particle size distribution in volume.

"D10" corresponds to the size of 10% of the particle volume.

According to another embodiment of the method according to the invention, a creel is present before the tank comprising a fluidised bed for controlling the tension of said roving (s) at the tank inlet comprising a fluidised bed.

Optionally, in the method according to the invention, one or more difficulties are present after the tank comprising the fluidised bed.

Shaping Step

As soon as it/they exit the tank (20), in particular comprising a fluidised bed (22), the pre-impregnated roving (parallel rovings), optionally covered a molten polymer, is (are) shaped into a single unidirectional ribbon or a plurality of parallel unidirectional ribbons, with a continuous calender device comprising one or more heating calender.

Advantageously, the heating calenders of the calendering device are coupled to rapid heating methods which heat the material not only at the surface but also at the core.

The fanned-out roving at the tank outlet (20) comprising a fluidised bed (22) then shrinks under the effect of heating, which contributes to inserting the molten polymer between the roving fibres thereby reducing the porosity of said roving and facilitating impregnation, particularly at the core of said roving.

The mechanical stress of the calenders coupled to these rapid heating methods enable the elimination of the presence of porosities and the homogeneous distribution of the polymer, especially when the fibrous material is "ready-to-use" material.

Advantageously, this hot calendering not only enables the impregnating polymer to be heated in order to penetrate, adhere and cover the fibres in a uniform manner, but the monitoring of the thickness and width of the ribbons of pre-impregnated fibrous material.

In order to be able to produce a plurality of unidirectional parallel ribbons, meaning as many ribbons as pre-impregnated parallel rovings, passed through the fluidised bed, heating calenders, referenced (51), (52), (53) in the diagram of FIG. 1, advantageously comprise a plurality of grooves (73) calender, in accordance with the number of ribbons. This number of grooves can for example be up to 200. A controlled system SYST also enables the regulation of the pressure and/or E spacing between rollers (71), (75) of calender (70) in order to monitor the ep thickness of the ribbons. Such a calender (70) is schematically illustrated in FIG. 2 described below.

The calender device comprises at least a heating calender (51). Preferably, it comprises several heating calenders (51), (52), (53) connected in parallel and/or in series with respect to the direction of travel of the fibre rovings.

In particular, the successive calendering step is carried out gradually with pressures between increasing rollers which (in the process running direction) and/or a decreasing spacing between the rollers (in the running direction of the process).

Having several serial calenders compacts the material and reduces the degree of porosity in the material and reduce their rates. This plurality of calenders is thereby important when the intention is to produce "ready to use" fibrous materials.

Having several parallel grilles increases the number of pre-treated rovings.

Advantageously each calender the calendering device comprises an induction or microwave integrated heating system, preferably by microwaves, to heat the polymer or mixture of thermoplastic polymers. Advantageously, when the polymer or mixture of polymers comprises carbon-containing fillers, such as carbon black or carbon nanofillers, preferably selected from carbon nanofillers, in particular graphenes and/or carbon nanotubes and/or carbon nanofibrils or mixtures thereof, the effect of microwave or induction heating is amplified by the presence of these charges which then transmit the heat to the core of the material.

Advantageously, each calender (51), (52), (53) of the device is coupled to a fast heating device (41), (42), (43), located before and/or after each calender to quickly transmit heat energy to the material and complete the impregnation of the fibres by the molten polymer. The rapid heating device can for example be selected from the following devices: a microwave device or induction, an IR laser or infra-red device or other device to direct contact with the heat source such as a device to a flame or a hot gas. A microwave or induction device is very advantageous, especially when coupled to the presence of carbon nanofillers in the polymer or polymer mixture since the carbon nanofillers amplify the heating effect and transmit it to the core of the material.

According to an alternative embodiment, it is also possible to combine several of these heating devices.

The method can further comprise a step of heating the fibre rovings, prior to said impregnation with, as a preferred heating methods, microwave heating as with the heating system of said heating calender.

Optionally, a subsequent step is the winding of one or more pre-impregnated and shaped ribbons. To that effect, the unit (100) for implementing the method comprises a winding device (60) comprising as many coils (61) as ribbons, a coil (61) being assigned to each ribbon. A splitter (62) is generally provided to deflect the pre-impregnated ribbons to their respective coils (61), while preventing the ribbons from touching to prevent any degradation.

FIG. 2 shows schematically the detail of the grooves (73) of a calender (70) sectional view. A calender (70) includes an upper roller (71) and a lower roller (75). One of the rollers, for example the upper roller (71), comprises a crenellated part (72), while the other roller, meaning the lower roller (75) in the example, comprises a grooved part (76), the shape of the grooves being complementary to the shape of the projecting parts (72) of the upper roller. The spacing E between the rollers (71), (75) and/or the pressure exerted by the two rollers against one another makes it possible to define the dimensions of the grooves 73), and especially their thickness ep and width I. Each groove (73) is provided to house a fibre roving which is then pressed and heated between the rollers. The rovings then turn into parallel unidirectional ribbons the thickness and width of which are calibrated by the grooves (73) of the calenders. Each calender advantageously comprises a plurality of grooves, the number of which can be up to 200, in order to produce as many ribbons as grooves and pre-impregnated rovings. The calendering device further comprises a central device, referenced SYST in FIG. 1, controlled by a computer program provided for this purpose, which enables the simultaneous regulation of the pressure and/or spacing of the calendering rollers of all unit 100 calenders.

The one-way ribbon (s) thus manufactured has/have a width I and a thickness ep adapted for robot removal in three-dimensional part manufacture, without the need to be split at the right width. The width of the ribbon (s) is advantageously between 5 and 400 mm, preferably between 5 and 50 mm, and even more preferably between 5 and 15 mm.

The just described process for manufacturing a pre-impregnated fibrous material, thus enables the production pre-impregnated fibrous materials with high productivity, while enabling impregnation, especially at the core of the fibres, and porosity control and reproducibility, thus enabling the control and reproducibility of the results of the envisaged final composite article. The impregnation especially at the core around the fibres and the absence of porosities are ensured by the impregnation step in the tank by controlling the residence time in said powder, especially a tank comprising a fluidised bed, and "wedge effect", coupled with the simultaneous spreading of the roving at the compression roller (s). The materials obtained are semi-finished products in the form of ribbons calibrated in thickness and in width, with low porosity.

The method thus enables the production of calibrated ribbons of pre-impregnated fibrous material adapted to the manufacture of three-dimensional composite parts, by automatic removal of said ribbons using a robot.

Advantageously, the thermoplastic polymer of the ribbon obtained with the process according to the invention is selected from amorphous polymers the glass transition temperature of which is such that Tg≥80° C. and/or from semi-crystalline polymers the melting temperature of which Tf is ≥150° C.

Advantageously, said thermoplastic polymer is:

an aliphatic polyamide selected from polyamide 6 (PA-6), polyamide 11 (PA-11), polyamide 12 (PA-12), polyamide 66 (PA-66), polyamide 46 (PA-46) polyamide 610 (PA-610), polyamide 612 (PA-612), polyamide 1010 (PA-1010), polyamide 1012 (PA-1012), mixtures thereof and copolyamides thereof, in particular 1010/11, 1010/12 etc.

an aromatic polyamide, optionally modified with urea units, in particular a polyphthalamide, in particular a semi-aromatic polyamide of formula X/YAr, as described in EP1505099, including a semi-aromatic polyamide of formula A/XT wherein A is selected from a unit obtained from an amino acid, a unit obtained from a lactam and a unit having the formula (Ca diamine).(Cb diamine), where a represents the number of carbon atoms of the diamine and b represents the number of carbon atoms of the diacid, a and b each being between 4 and 36, advantageously between 9 and 18;

XT denotes a unit obtained from the polycondensation of a diamine in Cx and terephthalic acid, with x representing the number of carbon atoms of the diamine in Cx, x being between 6 and 36, advantageously between 9 and 18, in particular a polyamide of formula A/6T, A/9T, A/10T or A/11T, A being as defined above, in particular a polyamide PA6/6T, 66/6T, 61/6T, PA11/10T, 11/6T/10T, MXDT/10T or MPMDT/10T, BACT/10T aramid, and block copolymers, especially polyamide/polyether (PEBA).

Advantageously, the fibrous material of the ribbon obtained with the process according to the invention is made of carbon fibre.

Advantageously, the thermoplastic polymer of the ribbon obtained with the process according to the invention is a semi-aromatic polyamide, in particular selected from PA 11, PA 12, PA 11/1010, PA 12/1010, PA 11/10T, PA 11/6T/10T, PA MXDT/10T, PA MPMDT/10T and PA BACT/10T and the fibrous material of the ribbon obtained with the process according to the invention is made of carbon fibre.

Advantageously, said ribbon the thermoplastic polymer of which is a polyamide selected from PA 11, PA 12, PA 11/1010, PA 12/1010, PA 11/10T, PA 11/6T/10T, PA MXDT/10T, PA MPMDT/10T and PA BACT/10T is used for civil or military aeronautics or automotive.

Advantageously, the thermoplastic polymer of the ribbon obtained with the process according to the invention is PEKK.

Advantageously, the fibrous material of the ribbon obtained with the process according to the invention is made of carbon fibre.

Advantageously, the thermoplastic polymer of the ribbon obtained with the process according to the invention is PEKK and the fibrous material of the ribbon obtained with the process according to the invention is made of carbon fibre.

Advantageously, the thermoplastic polymer of the ribbon obtained with the process according to the invention is PEI.

Advantageously, the fibrous material of the ribbon obtained with the process according to the invention is made of carbon fibre.

Advantageously, the thermoplastic polymer of the ribbon obtained with the process according to the invention is PEI and the fibrous material of the ribbon obtained with the process according to the invention is made of carbon fibre.

Advantageously, the thermoplastic polymer of the ribbon obtained with the process according to the invention is a mixture of PEKK and PEI, preferably 90-10% to 60-40%, in particular 90-10% to 70-30% by weight. Advantageously, the fibrous material of the ribbon obtained with the process according to the invention is made of carbon fibre.

Advantageously, the thermoplastic polymer of the ribbon obtained with the process according to the invention is a mixture of PEKK and PEI and the fibrous material of the ribbon obtained with the process according to the invention is made of carbon fibre.

According to another aspect, the present invention relates to the use of the ribbon of pre-impregnated fibrous material, as defined above, in the manufacture of three-dimensional composite parts.

Advantageously, said manufacture of said composite parts concerns the fields of transport, in particular automobile, oil and gas, especially offshore, gas storage, civil or military aeronautics, nautical, railway; renewable energy, in particular wind turbine, tidal turbine, energy storage devices, solar panels; thermal protection panels; sports and recreation, health and medical, ballistics with weapon or missile parts, security and electronics.

According to yet another aspect, the present invention relates to a three-dimensional composite part, characterized in that it results from the use of at least one unidirectional ribbon of pre-impregnated fibrous material as defined above.

ADVANTAGEOUS EMBODIMENTS OF THE METHOD OF THE INVENTION

Advantageously, the fibrous material is selected from carbon fibre and fibreglass.

Advantageously, the thermoplastic polymer used for impregnating the carbon fibre is selected from a polyamide, in particular an aliphatic polyamide such as PA 11, PA 12, PA 11/1010 or PA 12/1010 or a semi-aromatic polyamide, in particular a polyamide. PA 11/10T, a PA 11/6T/10T, a PA MXDT/10T or a PA MPMDT/10T, or PA BACT/10T, a PEKK and a PEI or a mixture thereof.

Advantageously, the thermoplastic polymer used for impregnating the carbon fibre is selected from a polyamide, in particular an aliphatic polyamide such as PA 11, PA 12, PA 11/1010 or PA 12/1010 or a semi-aromatic polyamide, in particular a polyamide. PA 11/10T, a PA 11/6T/10T, a PA MXDT/10T or a PA MPMDT/10T, or PA BACT/10T, a PEKK and a PEI or a mixture thereof.

Advantageously, the content of fibres in said fibrous material, consisting of impregnated carbon or glass fibre, is 45 to 65% by volume, preferably 50 to 60% by volume, in particular 54 to 60% by volume.

Table I below groups advantageous embodiments according to the process of the invention carried out in a tank comprising a fluidised bed for a carbon fibre or glass fibre roving with one or more un-grooved cylindrical compression rollers:

TABLE I

| Embodiment no | Fibrous material (fibre of) | Polymer | Number of compression rollers | Residence time (s) | Angle $\alpha_1$ (°) |
|---|---|---|---|---|---|
| 1 | Carbon | Polyamide | 1 | 0.1 to 5 | 5 to 85 |
| 2 | Carbon | Polyamide | 1 | 0.1 to 5 | 5 to 45 |
| 3 | Carbon | Polyamide | 1 | 0.1 to 5 | 5 to 30 |
| 4 | Carbon | Polyamide | 1 | 0.1 to 3 | 5 to 85 |
| 5 | Carbon | Polyamide | 1 | 0.1 to 3 | 5 to 45 |
| 6 | Carbon | Polyamide | 1 | 0.1 to 3 | 5 to 30 |
| 7 | Carbon | Polyamide | 2 | 0.1 to 5 | 5 to 85 |
| 8 | Carbon | Polyamide | 2 | 0.1 to 5 | 5 to 45 |
| 9 | Carbon | Polyamide | 2 | 0.1 to 5 | 5 to 30 |
| 10 | Carbon | Polyamide | 2 | 0.1 to 3 | 5 to 85 |
| 11 | Carbon | Polyamide | 2 | 0.1 to 3 | 5 to 45 |
| 12 | Carbon | Polyamide | 2 | 0.1 to 3 | 5 to 30 |
| 13 | Carbon | Polyamide | 3 | 0.1 to 5 | 5 to 85 |
| 14 | Carbon | Polyamide | 3 | 0.1 to 5 | 5 to 45 |
| 15 | Carbon | Polyamide | 3 | 0.1 to 5 | 5 to 30 |
| 16 | Carbon | Polyamide | 3 | 0.1 to 3 | 5 to 85 |
| 17 | Carbon | Polyamide | 3 | 0.1 to 3 | 5 to 45 |
| 18 | Carbon | Polyamide | 3 | 0.1 to 3 | 5 to 30 |
| 19 | Carbon | PEKK | 1 | 0.1 to 5 | 5 to 85 |
| 20 | Carbon | PEKK | 1 | 0.1 to 5 | 5 to 45 |
| 21 | Carbon | PEKK | 1 | 0.1 to 5 | 5 to 30 |
| 22 | Carbon | PEKK | 1 | 0.1 to 3 | 5 to 85 |
| 23 | Carbon | PEKK | 1 | 0.1 to 3 | 5 to 45 |
| 24 | Carbon | PEKK | 1 | 0.1 to 3 | 5 to 30 |
| 25 | Carbon | PEKK | 2 | 0.1 to 5 | 5 to 85 |
| 26 | Carbon | PEKK | 2 | 0.1 to 5 | 5 to 45 |
| 27 | Carbon | PEKK | 2 | 0.1 to 5 | 5 to 30 |
| 28 | Carbon | PEKK | 2 | 0.1 to 3 | 5 to 85 |
| 29 | Carbon | PEKK | 2 | 0.1 to 3 | 5 to 45 |
| 30 | Carbon | PEKK | 2 | 0.1 to 3 | 5 to 30 |
| 31 | Carbon | PEKK | 3 | 0.1 to 5 | 5 to 85 |
| 32 | Carbon | PEKK | 3 | 0.1 to 5 | 5 to 45 |
| 33 | Carbon | PEKK | 3 | 0.1 to 5 | 5 to 30 |
| 34 | Carbon | PEKK | 3 | 0.1 to 3 | 5 to 85 |
| 35 | Carbon | PEKK | 3 | 0.1 to 3 | 5 to 45 |
| 36 | Carbon | PEKK | 3 | 0.1 to 3 | 5 to 30 |
| 37 | Carbon | PEI | 1 | 0.1 to 5 | 5 to 85 |
| 38 | Carbon | PEI | 1 | 0.1 to 5 | 5 to 45 |
| 39 | Carbon | PEI | 1 | 0.1 to 5 | 5 to 30 |
| 40 | Carbon | PEI | 1 | 0.1 to 3 | 5 to 85 |
| 41 | Carbon | PEI | 1 | 0.1 to 3 | 5 to 45 |
| 42 | Carbon | PEI | 1 | 0.1 to 3 | 5 to 30 |
| 43 | Carbon | PEI | 2 | 0.1 to 5 | 5 to 85 |
| 44 | Carbon | PEI | 2 | 0.1 to 5 | 5 to 45 |
| 45 | Carbon | PEI | 2 | 0.1 to 5 | 5 to 30 |
| 46 | Carbon | PEI | 2 | 0.1 to 3 | 5 to 85 |
| 47 | Carbon | PEI | 2 | 0.1 to 3 | 5 to 45 |
| 48 | Carbon | PEI | 2 | 0.1 to 3 | 5 to 30 |
| 49 | Carbon | PEI | 3 | 0.1 to 5 | 5 to 85 |
| 50 | Carbon | PEI | 3 | 0.1 to 5 | 5 to 45 |
| 51 | Carbon | PEI | 3 | 0.1 to 5 | 5 to 30 |
| 52 | Carbon | PEI | 3 | 0.1 to 3 | 5 to 85 |
| 53 | Carbon | PEI | 3 | 0.1 to 3 | 5 to 45 |
| 54 | Carbon | PEI | 3 | 0.1 to 3 | 5 to 30 |
| 55 | Carbon | PEI | 1 | 0.1 to 5 | 5 to 85 |
| 56 | Carbon | PEI | 1 | 0.1 to 5 | 5 to 45 |
| 57 | Carbon | PEI | 1 | 0.1 to 5 | 5 to 30 |
| 58 | Carbon | PEI | 1 | 0.1 to 3 | 5 to 85 |
| 59 | Carbon | PEI | 1 | 0.1 to 3 | 5 to 45 |
| 60 | Carbon | PEI | 1 | 0.1 to 3 | 5 to 30 |
| 61 | Carbon | PEI | 2 | 0.1 to 5 | 5 to 85 |
| 62 | Carbon | PEI | 2 | 0.1 to 5 | 5 to 45 |
| 63 | Carbon | PEI | 2 | 0.1 to 5 | 5 to 30 |
| 64 | Carbon | PEI | 2 | 0.1 to 3 | 5 to 85 |
| 65 | Carbon | PEI | 2 | 0.1 to 3 | 5 to 45 |
| 66 | Carbon | PEI | 2 | 0.1 to 3 | 5 to 30 |
| 67 | Carbon | PEI | 3 | 0.1 to 5 | 5 to 85 |
| 68 | Carbon | PEI | 3 | 0.1 to 5 | 5 to 45 |
| 69 | Carbon | PEI | 3 | 0.1 to 5 | 5 to 30 |
| 70 | Carbon | PEI | 3 | 0.1 to 3 | 5 to 85 |
| 71 | Carbon | PEI | 3 | 0.1 to 3 | 5 to 45 |
| 72 | Carbon | PEI | 3 | 0.1 to 3 | 5 to 30 |
| 73 | Glass | Polyamide | 1 | 0.1 to 5 | 5 to 85 |
| 74 | Glass | Polyamide | 1 | 0.1 to 5 | 5 to 45 |
| 75 | Glass | Polyamide | 1 | 0.1 to 5 | 5 to 30 |
| 76 | Glass | Polyamide | 1 | 0.1 to 3 | 5 to 85 |
| 77 | Glass | Polyamide | 1 | 0.1 to 3 | 5 to 45 |
| 78 | Glass | Polyamide | 1 | 0.1 to 3 | 5 to 30 |
| 79 | Glass | Polyamide | 2 | 0.1 to 5 | 5 to 85 |
| 80 | Glass | Polyamide | 2 | 0.1 to 5 | 5 to 45 |
| 81 | Glass | Polyamide | 2 | 0.1 to 5 | 5 to 30 |
| 82 | Glass | Polyamide | 2 | 0.1 to 3 | 5 to 85 |
| 83 | Glass | Polyamide | 2 | 0.1 to 3 | 5 to 45 |
| 84 | Glass | Polyamide | 2 | 0.1 to 3 | 5 to 30 |
| 85 | Glass | Polyamide | 3 | 0.1 to 5 | 5 to 85 |
| 86 | Glass | Polyamide | 3 | 0.1 to 5 | 5 to 45 |
| 87 | Glass | Polyamide | 3 | 0.1 to 5 | 5 to 30 |
| 88 | Glass | Polyamide | 3 | 0.1 to 3 | 5 to 85 |
| 89 | Glass | Polyamide | 3 | 0.1 to 3 | 5 to 45 |
| 90 | Glass | Polyamide | 3 | 0.1 to 3 | 5 to 30 |
| 91 | Glass | PEKK | 1 | 0.1 to 5 | 5 to 85 |
| 92 | Glass | PEKK | 1 | 0.1 to 5 | 5 to 45 |
| 93 | Glass | PEKK | 1 | 0.1 to 5 | 5 to 30 |
| 94 | Glass | PEKK | 1 | 0.1 to 3 | 5 to 85 |
| 95 | Glass | PEKK | 1 | 0.1 to 3 | 5 to 45 |
| 96 | Glass | PEKK | 1 | 0.1 to 3 | 5 to 30 |
| 97 | Glass | PEKK | 2 | 0.1 to 5 | 5 to 85 |
| 98 | Glass | PEKK | 2 | 0.1 to 5 | 5 to 45 |
| 99 | Glass | PEKK | 2 | 0.1 to 5 | 5 to 30 |
| 100 | Glass | PEKK | 2 | 0.1 to 3 | 5 to 85 |
| 101 | Glass | PEKK | 2 | 0.1 to 3 | 5 to 45 |
| 102 | Glass | PEKK | 2 | 0.1 to 3 | 5 to 30 |
| 103 | Glass | PEKK | 3 | 0.1 to 5 | 5 to 85 |
| 104 | Glass | PEKK | 3 | 0.1 to 5 | 5 to 45 |
| 105 | Glass | PEKK | 3 | 0.1 to 5 | 5 to 30 |
| 106 | Glass | PEKK | 3 | 0.1 to 3 | 5 to 85 |
| 107 | Glass | PEKK | 3 | 0.1 to 3 | 5 to 45 |
| 108 | Glass | PEKK | 3 | 0.1 to 3 | 5 to 30 |
| 109 | Glass | PEI | 1 | 0.1 to 5 | 5 to 85 |
| 110 | Glass | PEI | 1 | 0.1 to 5 | 5 to 45 |
| 111 | Glass | PEI | 1 | 0.1 to 5 | 5 to 30 |
| 112 | Glass | PEI | 1 | 0.1 to 3 | 5 to 85 |
| 113 | Glass | PEI | 1 | 0.1 to 3 | 5 to 45 |
| 114 | Glass | PEI | 1 | 0.1 to 3 | 5 to 30 |
| 115 | Glass | PEI | 2 | 0.1 to 5 | 5 to 85 |
| 116 | Glass | PEI | 2 | 0.1 to 5 | 5 to 45 |
| 117 | Glass | PEI | 2 | 0.1 to 5 | 5 to 30 |
| 118 | Glass | PEI | 2 | 0.1 to 3 | 5 to 85 |
| 119 | Glass | PEI | 2 | 0.1 to 3 | 5 to 45 |
| 120 | Glass | PEI | 2 | 0.1 to 3 | 5 to 30 |
| 121 | Glass | PEI | 3 | 0.1 to 5 | 5 to 85 |
| 122 | Glass | PEI | 3 | 0.1 to 5 | 5 to 45 |
| 123 | Glass | PEI | 3 | 0.1 to 5 | 5 to 30 |
| 124 | Glass | PEI | 3 | 0.1 to 3 | 5 to 85 |
| 125 | Glass | PEI | 3 | 0.1 to 3 | 5 to 45 |
| 126 | Glass | PEI | 3 | 0.1 to 3 | 5 to 30 |
| 127 | Glass | PEI | 1 | 0.1 to 5 | 5 to 85 |
| 128 | Glass | PEI | 1 | 0.1 to 5 | 5 to 45 |
| 129 | Glass | PEI | 1 | 0.1 to 5 | 5 to 30 |
| 130 | Glass | PEI | 1 | 0.1 to 3 | 5 to 85 |
| 131 | Glass | PEI | 1 | 0.1 to 3 | 5 to 45 |
| 132 | Glass | PEI | 1 | 0.1 to 3 | 5 to 30 |
| 133 | Glass | PEI | 2 | 0.1 to 5 | 5 to 85 |
| 134 | Glass | PEI | 2 | 0.1 to 5 | 5 to 45 |
| 135 | Glass | PEI | 2 | 0.1 to 5 | 5 to 30 |
| 136 | Glass | PEI | 2 | 0.1 to 3 | 5 to 85 |
| 137 | Glass | PEI | 2 | 0.1 to 3 | 5 to 45 |
| 138 | Glass | PEI | 2 | 0.1 to 3 | 5 to 30 |
| 139 | Glass | PEI | 3 | 0.1 to 5 | 5 to 85 |
| 140 | Glass | PEI | 3 | 0.1 to 5 | 5 to 45 |
| 141 | Glass | PEI | 3 | 0.1 to 5 | 5 to 30 |
| 142 | Glass | PEI | 3 | 0.1 to 3 | 5 to 85 |
| 143 | Glass | PEI | 3 | 0.1 to 3 | 5 to 45 |
| 144 | Glass | PEI | 3 | 0.1 to 3 | 5 to 30 |

In embodiments comprising PEKK or PEI, PEKK can be in combination with PEI and the PEI can be in combination with PEKK in the proportions defined above.

Advantageously, in the compositions of table I above defined wherein two compression rollers are present in the fluidised bed, roller $R_2$ is above roller $R_1$ relative to the bottom of the tank, in particular $H_2$-$H_1$ ranges from 1 cm to 30 cm, preferably from 1 to 10 cm, in particular from 1 cm to 3 cm, in particular about 2 cm and angle $\alpha_2$ ranges from 0 to 90°, in particular from 25 to 45° C., in particular from 25 to 35°, and the roving runs over $R_2$.

These embodiments correspond to FIG. 5.

Advantageously, in the compositions of above-defined table I wherein two compression rollers are present in the fluidised bed, roller $R_2$ is above roller $R_1$ relative to the bottom of the tank, in particular $H_2$-$H_1$ ranges from 1 cm to 30 cm, especially about 2 cm and angle $\alpha_2$ ranges from 90 to 180° C., in particular from 115 to 135°, in particular from 115 to 125°, and the roving runs below $R_2$.

Advantageously, in the compositions of table I above, when the fibrous material is fibreglass, then the D50/average diameter ratio of the unit fibres is from 3 to 15, in particular from 4 to 15.

Advantageously, in the compositions of table I above, when the fibrous material is fibreglass, then the D50/average diameter ratio of the unit fibres is from 3 to 10, in particular from 4 to 10.

Advantageously, in the compositions of table I above, when the fibrous material is carbon fibre, then the D50/average diameter ratio of the unit fibres is between 10 to 40.

Advantageously, in the compositions of table I above defined wherein two compression rollers are present in the fluidised bed, roller $R_2$ is above roller $R_1$ relative to the bottom of the tank, in particular $H_2$-$H_1$ ranges from 1 cm to 3 cm, especially about 2 cm and angle $\alpha_2$ is 25 to 45° C., in particular 25 to 35° and the roving runs above $R_2$; and when the fibre material is fibreglass, then the D50/average diameter ratio of the unit fibres ranges from 3 to 15, especially from 4 to 15, in particular from 3 to 10, in particular from 4 to 10.

Advantageously, in the compositions of table I above defined wherein two compression rollers are present in the fluidised bed, roller $R_2$ is above roller $R_1$ relative to the bottom of the tank, in particular $H_2$-$H_1$ ranges from 1 cm to 3 cm, especially about 2 cm and the angle $\alpha_2$ is from 80 to 45° C., in particular from 60 to 45° and the roving runs below $R_2$ and when the fibre material is fibreglass, then the D50/average diameter ratio of the unit fibres ranges from 3 to 15, in particular from 4 to 15, in particular from 3 to 10, in particular from 4 to 10.

Advantageously, in the compositions of table I above defined wherein two compression rollers are present in the fluidised bed, roller $R_2$ is above roller $R_1$ relative to the bottom of the tank, in particular $H_2$-$H_1$ ranges from 1 cm to 3 cm, especially about 2 cm and the angle $\alpha_2$ is 25 to 45° C., in particular 25 to 35° and the roving runs above $R_2$; and when the fibrous material is carbon fibre, then the D50/average diameter ratio of the unit fibres ranges from 10 to 40.

Advantageously, in the compositions of table I above defined wherein two compression rollers are present in the fluidised bed, roller $R_2$ is above roller $R_1$ relative to the bottom of the tank, in particular $H_2$-$H_1$ ranges from 1 cm to 3 cm, especially about 2 cm and the angle $\alpha_2$ is from 80 to 45° C., in particular from 60 to 45° and the roving runs below $R_2$ and when the fibre material is carbon fibre, then the D50/average diameter ratio of the unit fibres ranges from 10 to 40.

The arrows on the fibre indicate the fibre scrolling direction.

Figure 1:
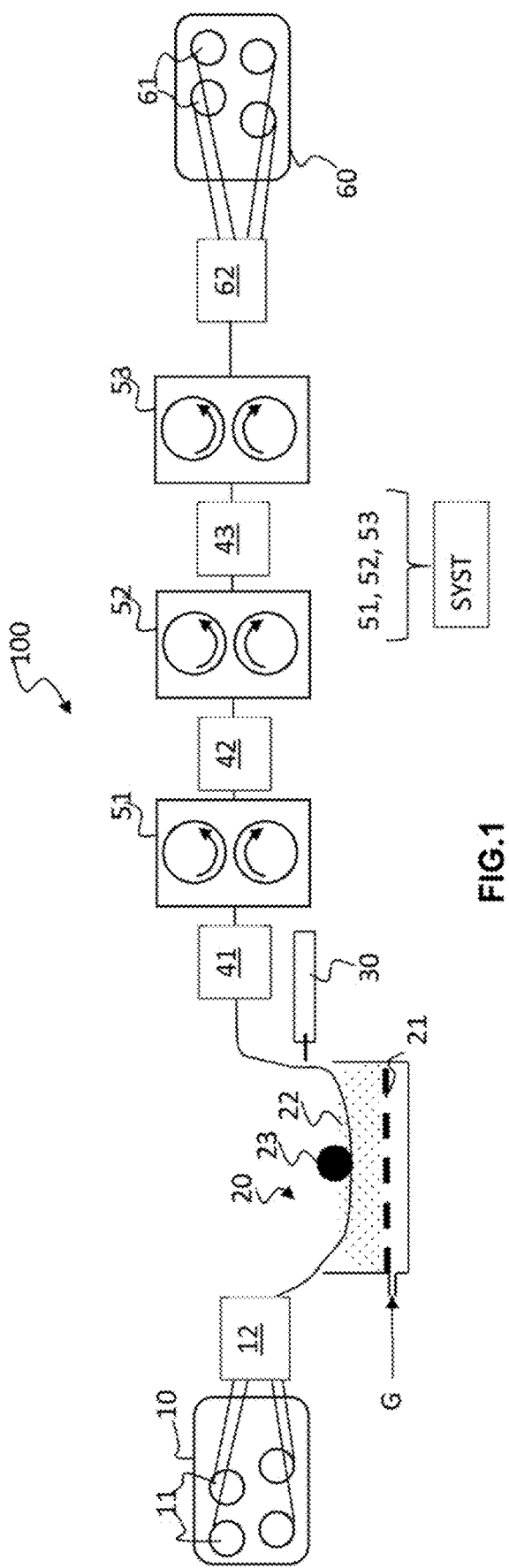
FIG. 1 shows a diagram of an implementation unit of the method of manufacturing a pre-impregnated fibrous material according to the invention.
Figure 2:
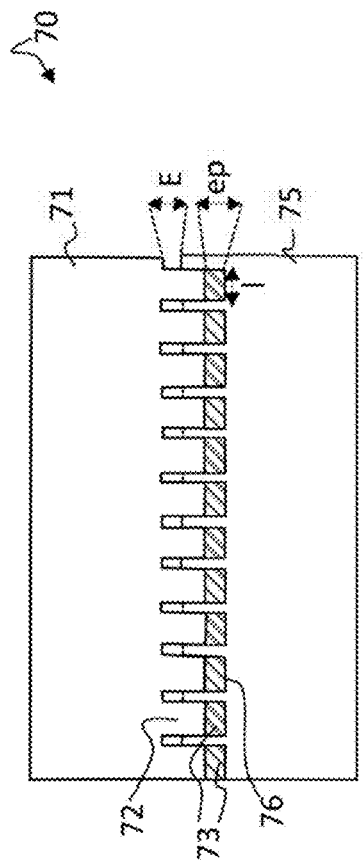
FIG. 2 shows a sectional diagram of two rollers constituting a calender as used in the unit of FIG. 1.
Figure 3:
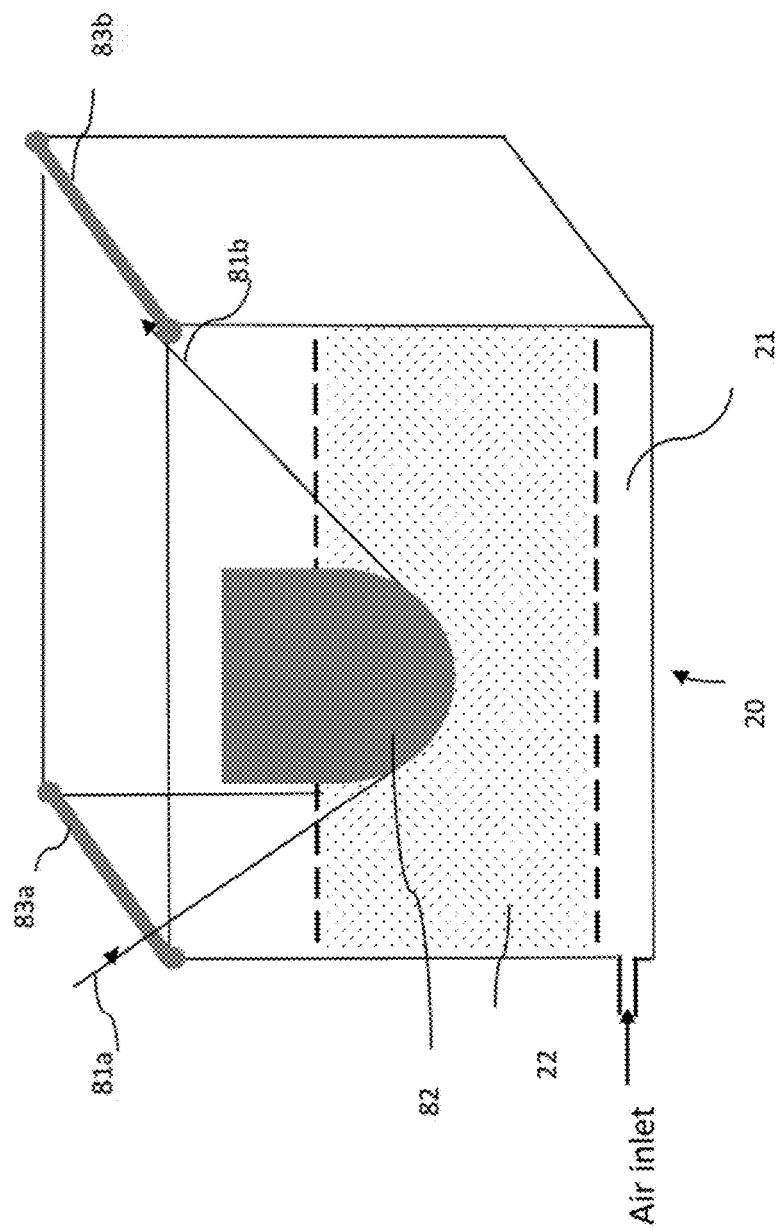
FIG. 3 details a tank (20) comprising a fluidised bed (22) with a height-adjustable, height-adjustable tension device (82). The edge of the tank inlet is equipped with a rotating roller 83a on which the roving 81a runs and the edge of the tank outlet is equipped with a rotary roller 83b on which the roving 81b runs.
Figure 4:
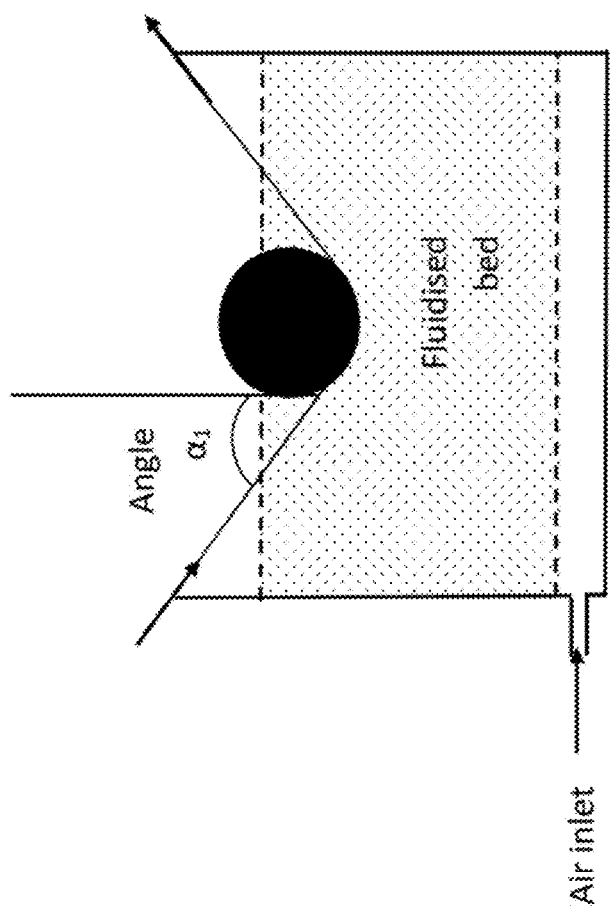
FIG. 4 shows a single compression roller embodiment with a tank (20) with a fluidised bed (22) wherein a single cylindrical compression roller is present and displaying angle $\alpha_1$.
Figure 5:
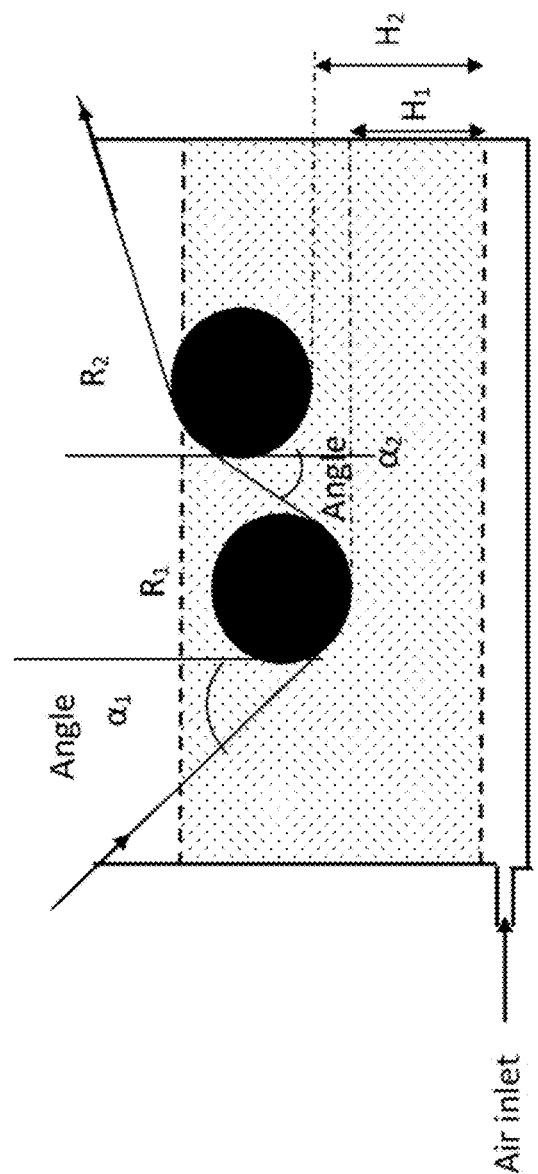

FIG. 5 shows an embodiment, without being limited thereto, with two compression rollers $R_1$ and $R_2$, $R_1$ preceding $R_2$, with a tank (20) comprising a fluidised bed (22) wherein the two cylindrical compression rollers are at different heights relative to the bottom of the tank ($R_2$ at a height $H_2$ above $R_1$ at a height $H_1$) are present and displaying angle $\alpha_1$ and $\alpha_2$.

The arrows on the fibre indicate the fibre scrolling direction.

Figure 6:
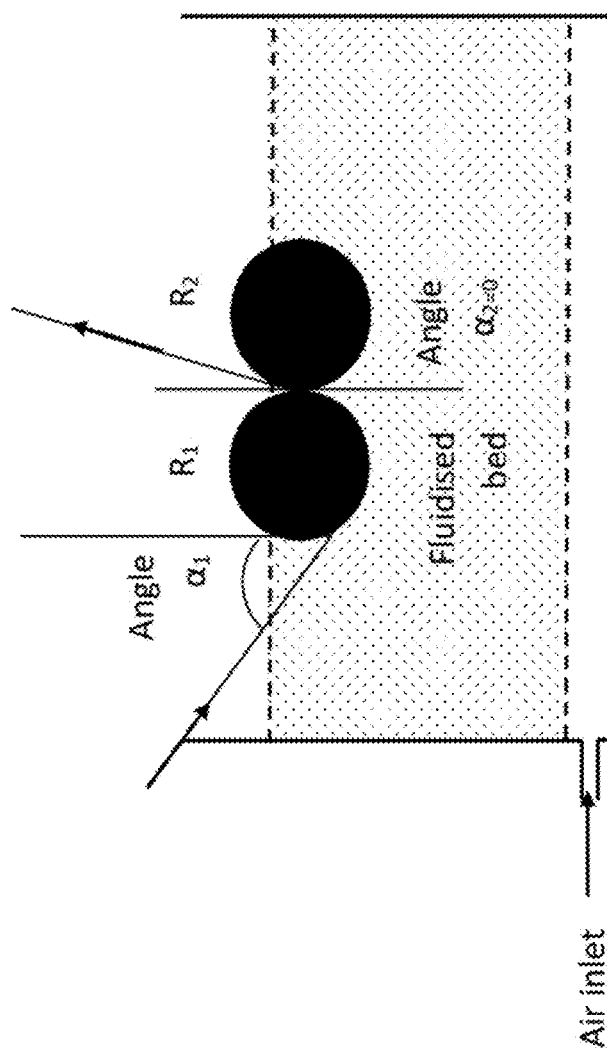

FIG. 6 shows a sample embodiment with a tank (20) comprising a fluidised bed (22) wherein the two compression rollers $R_1$ and $R_2$ are cylindrical, at the same level with respect to each other and side by side and displaying angle $\alpha_1$, and angle $\alpha_2$=0° and the roving passing between the 2 rollers).

Figure 7:
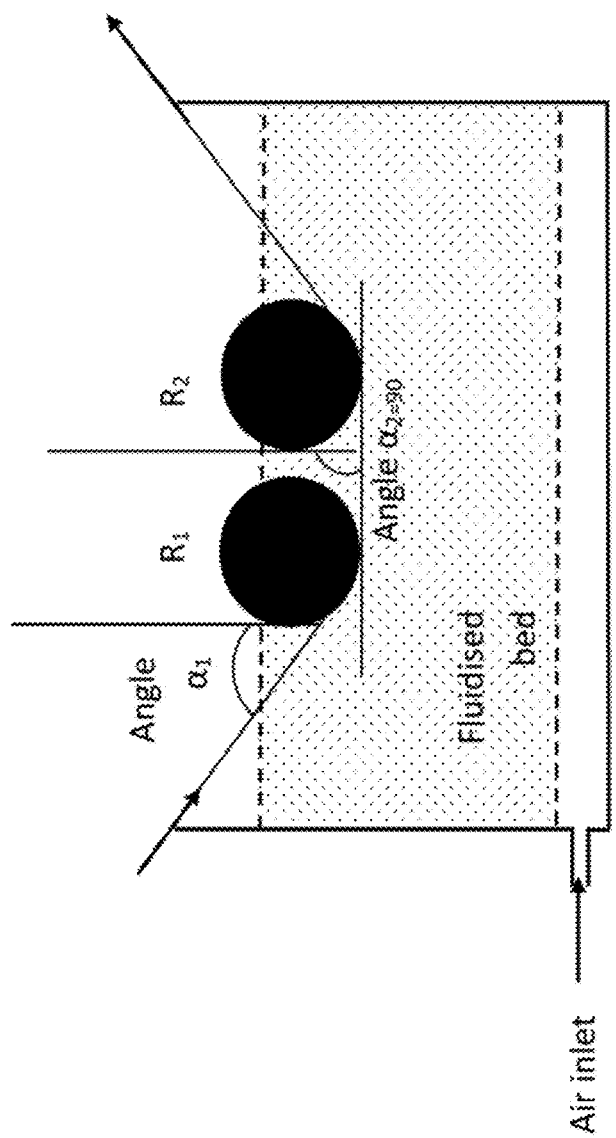

FIG. 7 shows a sample embodiment with a tank (20) comprising a fluidised bed (22) wherein the two compression rollers $R_1$ and $R_2$ are cylindrical, at the same level with respect to each other and side by side and displaying angle $\alpha_1$, and angle $\alpha_2$=90° and the roving running below $R_2$.

Figure 8:
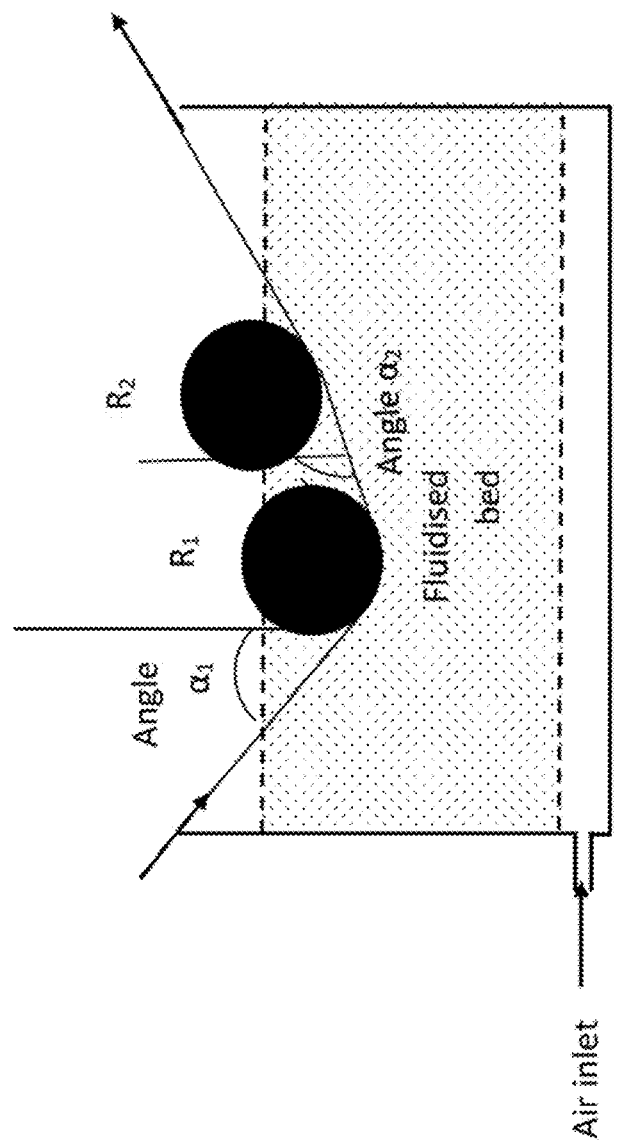

FIG. 8 shows a sample embodiment with a tank (20) comprising a fluidised bed (22) wherein two cylindrical compression rollers $R_1$ and $R_2$, $R_1$ preceding $R_2$, at different levels are present and displaying angle $\alpha_1$ and $\alpha_2$ and the roving running under roller $R_2$.

Figure 9:
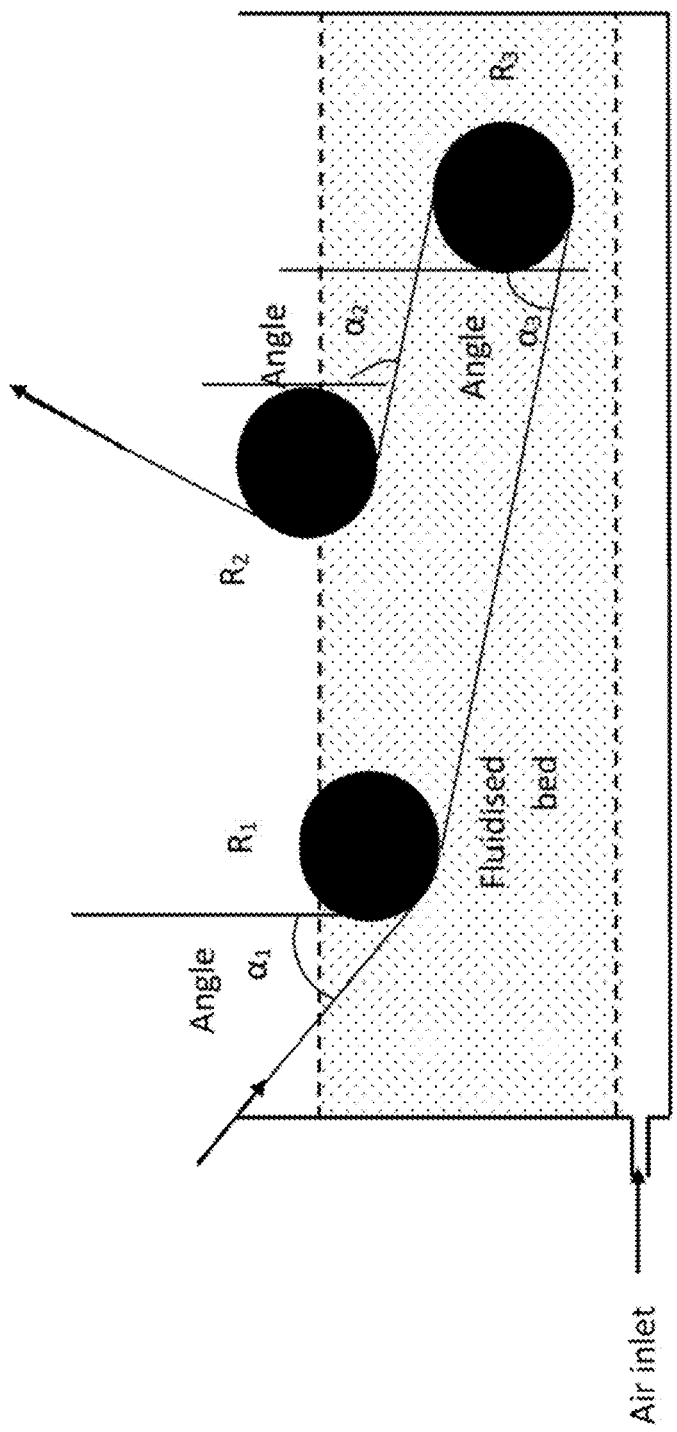

FIG. 9 shows an embodiment with a tank (20) comprising a fluidised bed (22) with two compression rollers $R_1$ and $R_2$, $R_1$ preceding $R_2$, and a compression roller $R_3$ and showing angles $\alpha_1$, $\alpha_2$ and $\alpha_3$.

Figure 10:
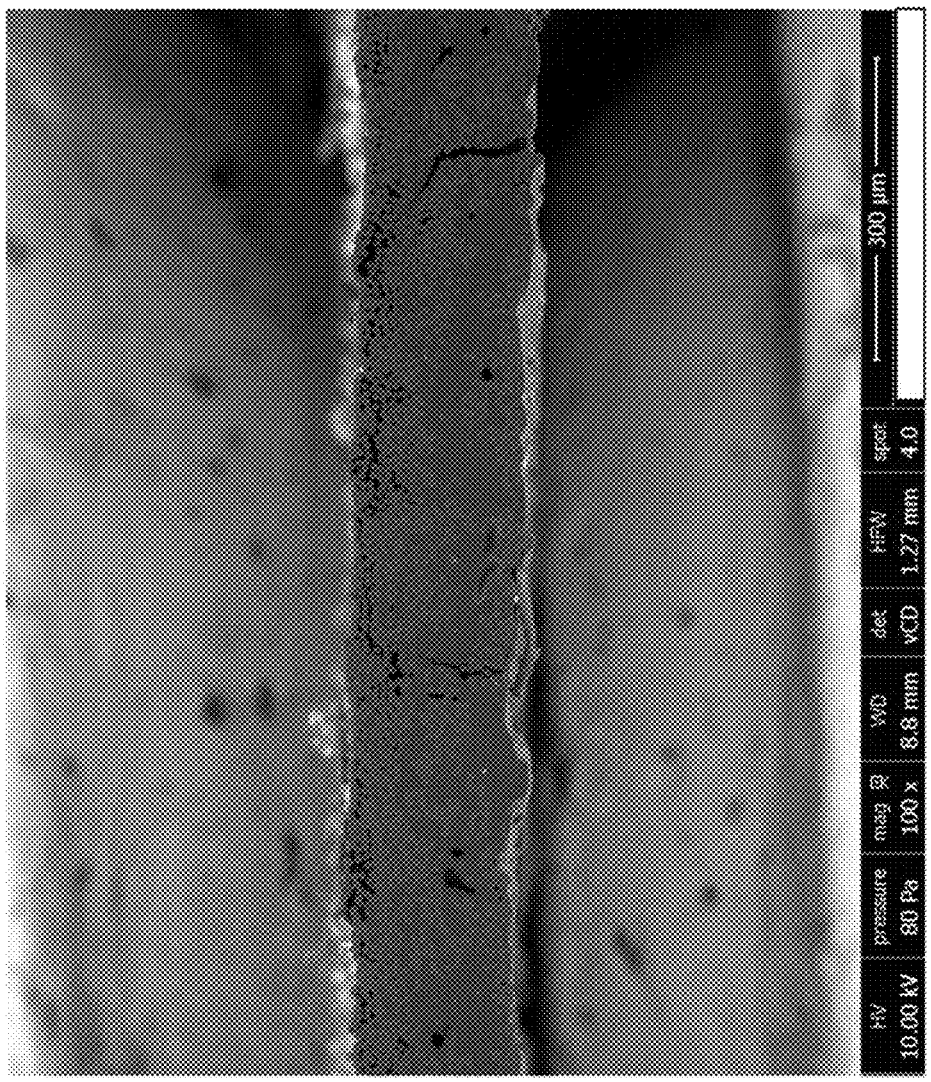

FIG. 10 shows a photograph taken with a scanning electron microscope of a sectional view of a ¼ "carbon fibre roving" (Toray 12K T700S M0E fibre, diameter 7 μm), impregnated with a polyamide PA powder MPMDT/10T of D50=115 μm according to the process of the invention (as described in example 2, after calendering).

The image analysis gives a porosity of 5% excluding the edges of the strip.

The D50/diameter ratio=16.4.

Figure 11:
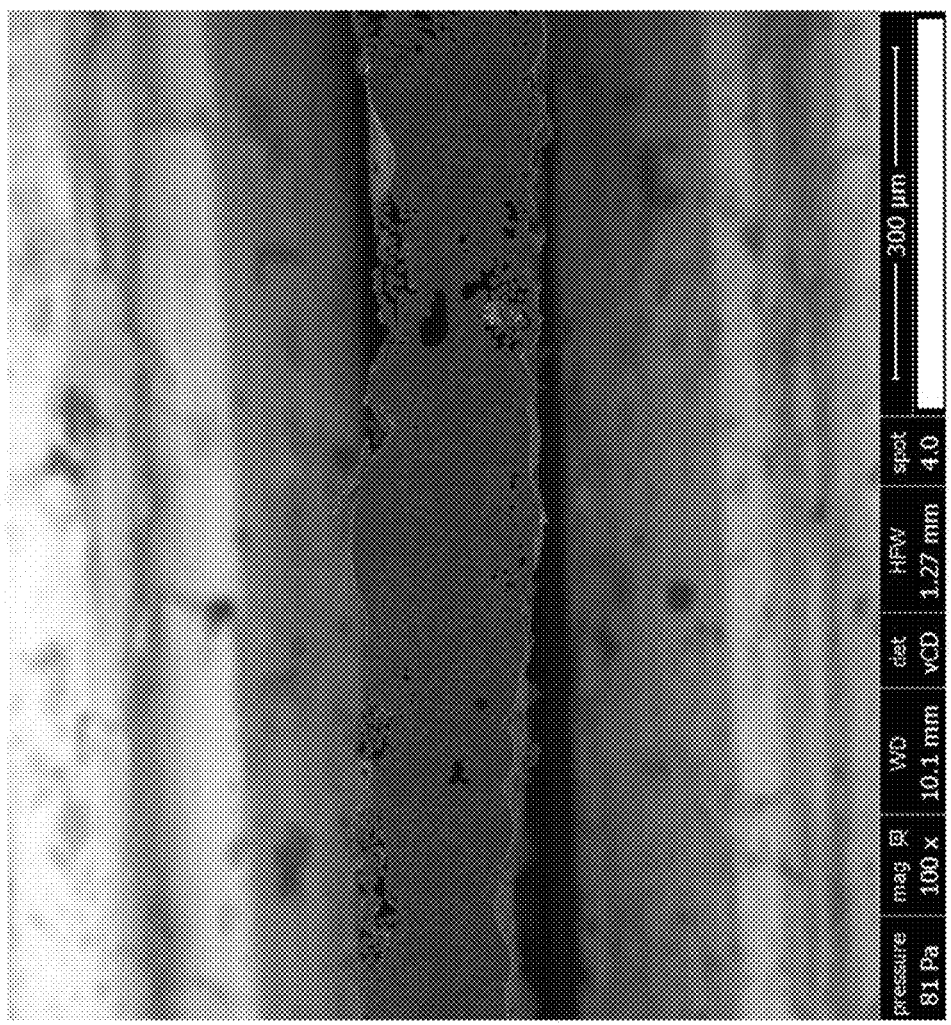

FIG. 11 shows a photograph taken with a scanning electron microscope of a sectional view of a ¼ "carbon fibre roving" (Toray 12K T700 fibre, diameter 7 μm) impregnated with a PA 11/6T/10T polyamide powder of D50=132 μm according to the process of the invention (as described in example 2, after calendering).

The D50/diameter ratio=18.9.

Figure 12:
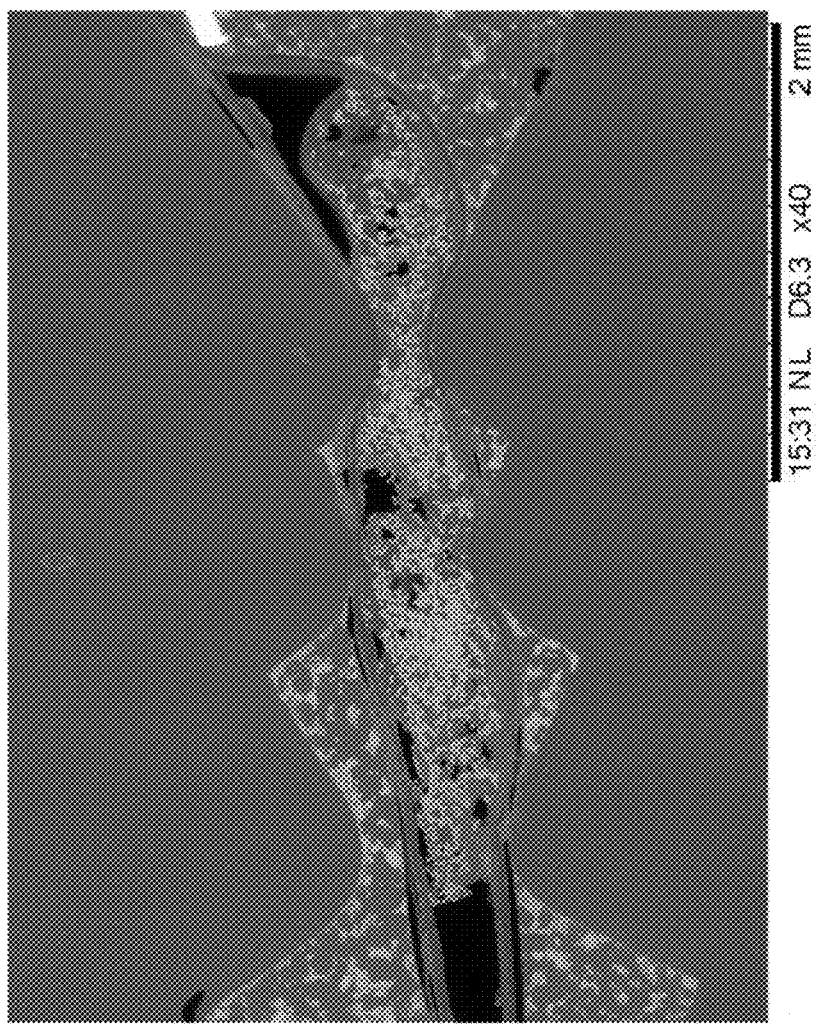

FIG. 12 shows a photograph taken under a scanning electron microscope of a sectional view of a 3B HiPer Tex 2400 tex fibreglass mesh (diameter 17 μm), impregnated with a PA 11 polyamide powder of D50=120 μm according to the method of invention (as described in example 3, before calendering).

The D50/diameter ratio=7.

Figure 13:
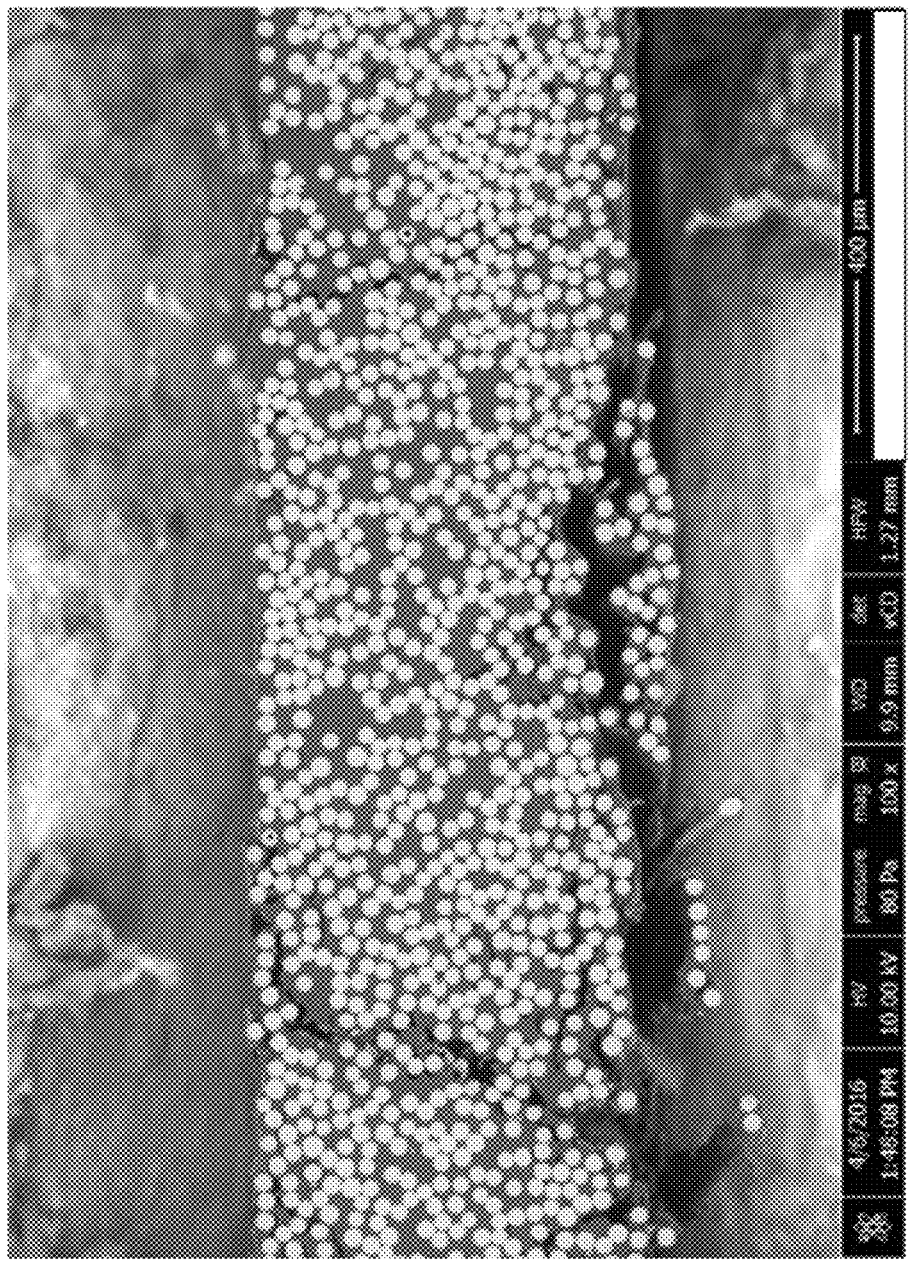

FIG. 13 shows a photograph taken under a scanning electron microscope of a sectional view of a 3B HiPer Tex 2400 tex fibreglass mesh (diameter 17 μm), impregnated with a PA 11/6T/10T of D50=132 μm according to the method of invention (as described in example 3, before calendering).

The D50/diameter ratio=7.

Figure 14:
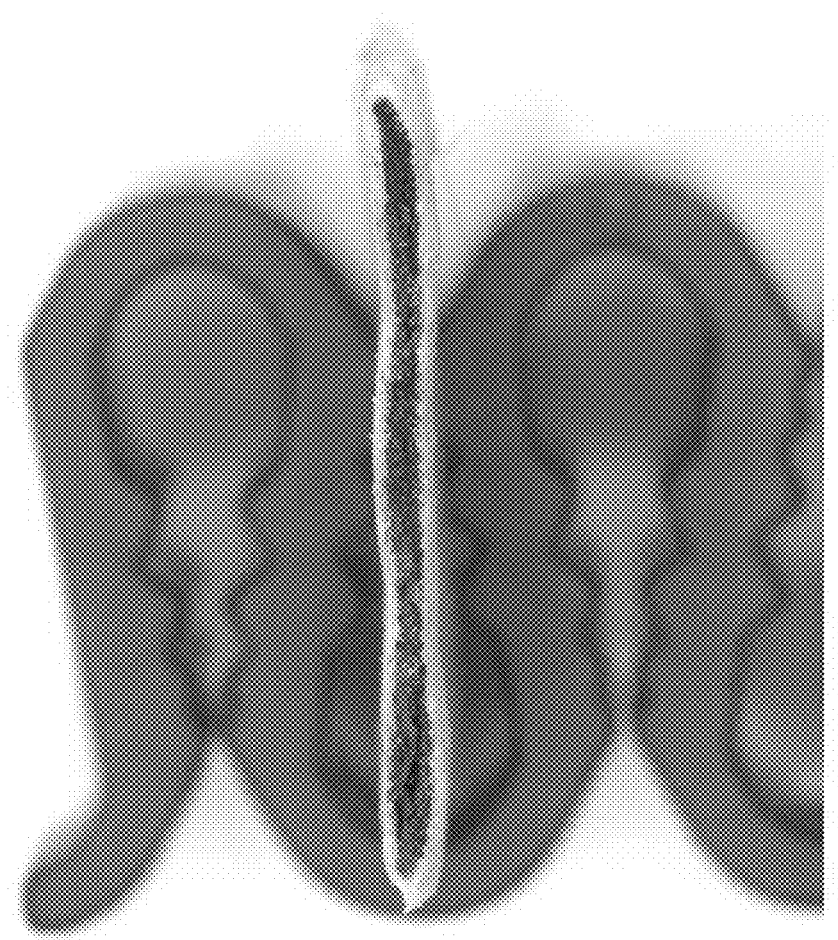

FIG. 14 shows a binocular photograph of a sectional view of a ½ "(SGL grade AA, 50K, diameter 7 μm) carbon fibre roving impregnated with a polyamide powder MPMDT/10T of D50=115 μm according to the process of the invention (as described in example 4, after calendering).

The D50/diameter ratio=16.4.

Figure 15:
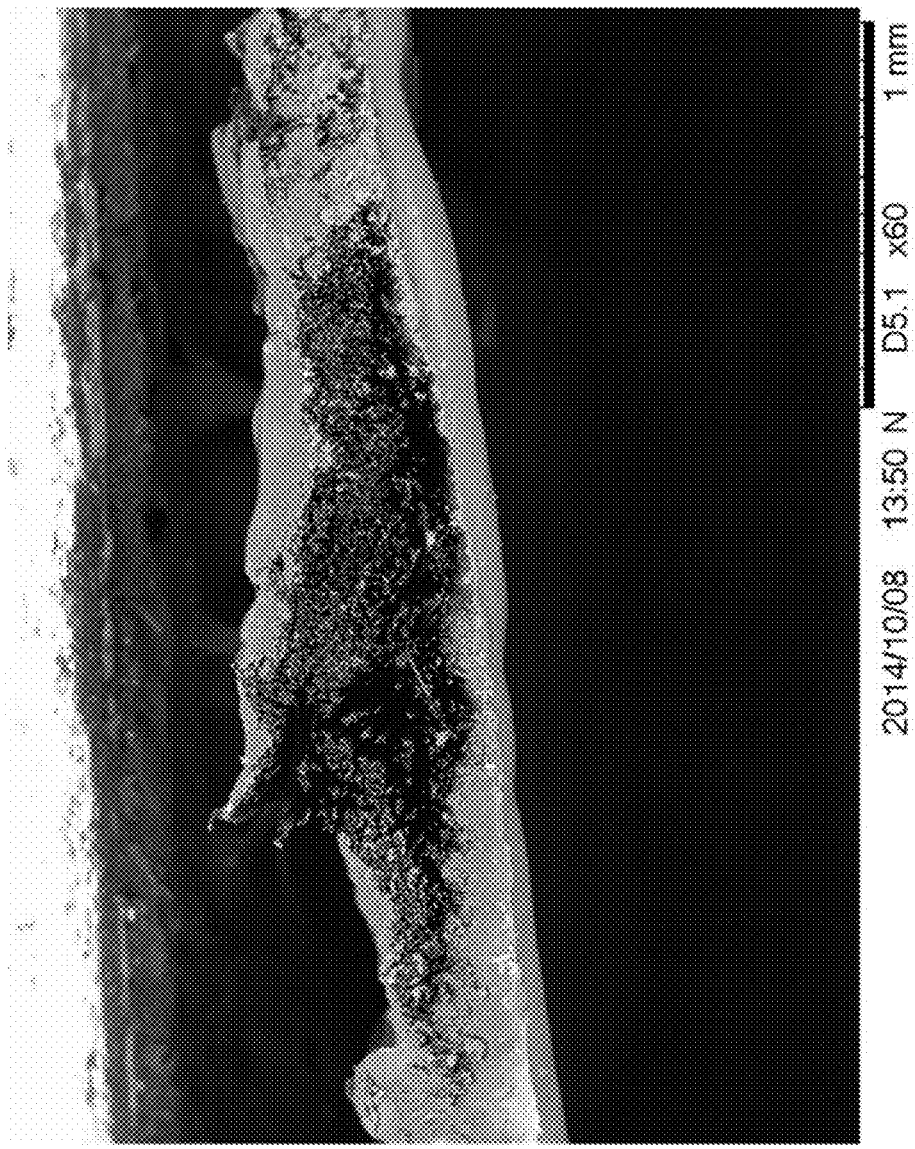

FIG. 15 shows a photograph taken with a scanning electron microscope of a sectional view of a ¼ "carbon fibre roving" (Toray 12K T700 fibre, diameter 7 μm) impregnated with a PA 11 polyamide powder of D50=20 μm according to the process of the invention (as described in example 2, after calendering).

The D50/diameter ratio=2.8.

Figure 16:
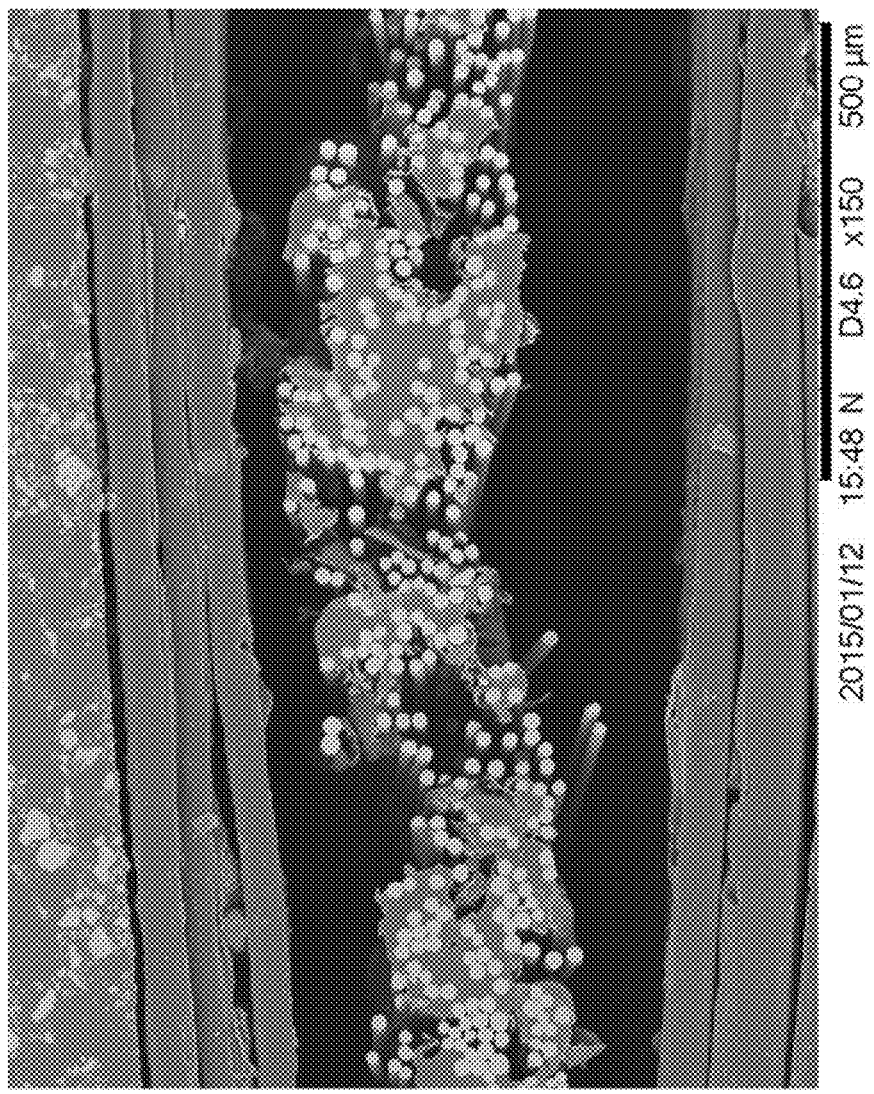

FIG. 16 shows a photograph taken under a scanning electron microscope of a sectional view of a 3B HiPer Tex 2400 tex fibreglass mesh (diameter 17 μm), impregnated with a PA 11 polyamide powder of D50=30 μm according to the method of invention (as described in example 2, before calendering).

The D50/diameter ratio=1.8.

Figure 17:
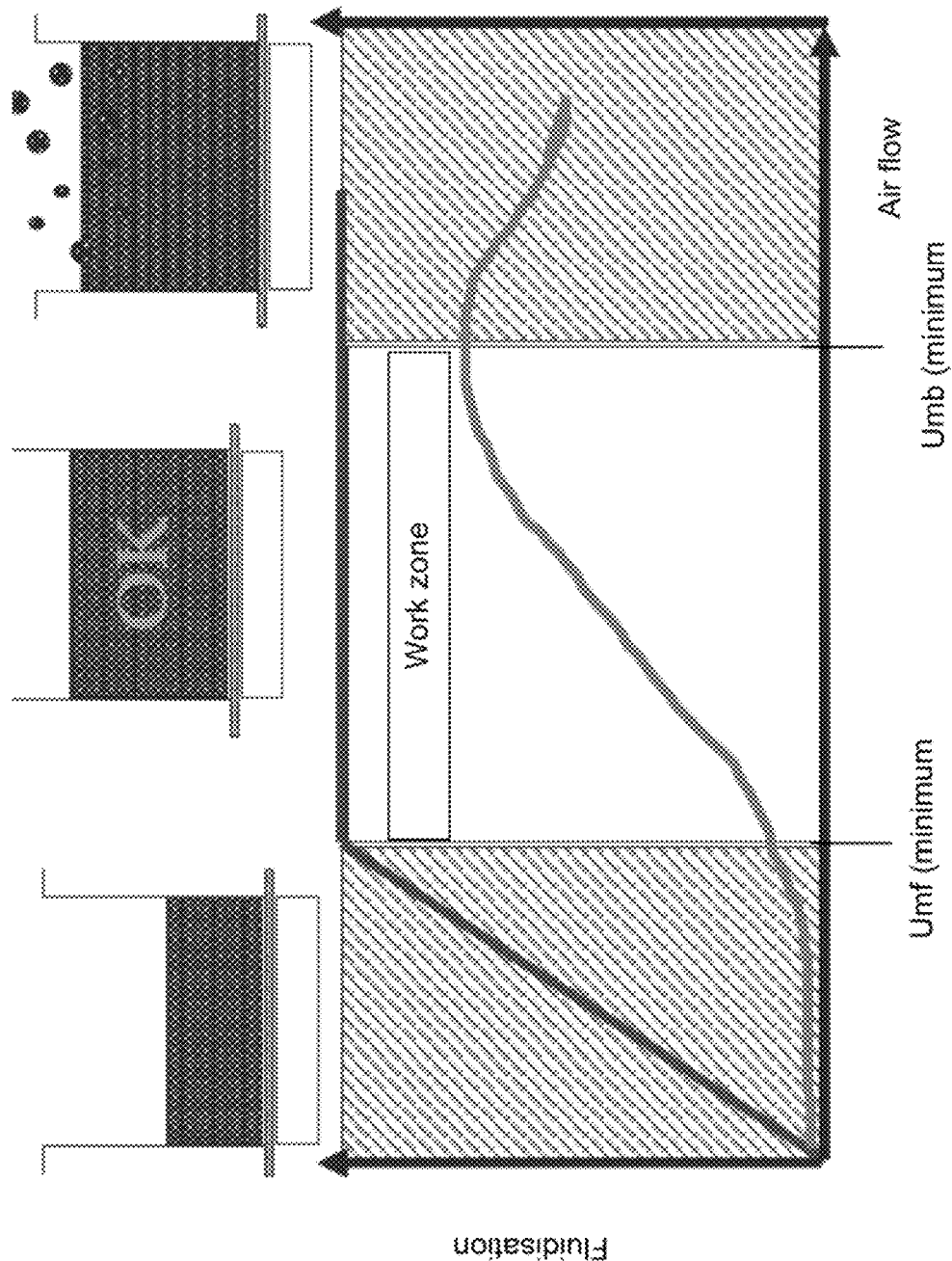

FIG. 17 shows fluidisation based on airflow. The air flow rate applied to the fluidised bed must be between the minimum fluidisation velocity (Umf) and the minimum bubbling flow rate (Umb)

The following examples illustrate in a non-limiting manner the scope of the invention.

Example 1 (Comparative Example)

A carbon fibre roving (Toray 12K T700S M0E, diameter 7 μm), was impregnated with PA 11/6T/10T of D50=20 μM.

The D50/diameter ratio=2.8, being <3.

Results

Example 1a (Comparative Example)

A fibre glass roving (3B Fibre glass 2400 tex, diameter 17 μm), was impregnated with PA11 of D50=30 μm.

The D50/diameter ratio=1.8, being <3.

The results are shown in FIG. 15 (PA 11 example 1) and 16 (PA11 example 1a) show poor impregnation at core, related to the fact that the powder is too thin (and has an excessively narrow size distribution) to be properly fluidised. In particular, many instabilities are present in the fluidised bed (presence of bubbles) which hinder the impregnation process. In addition, in both examples (glass and carbon) the fibre roving spreaded by the fluidised bed has difficulty retaining the powder due to its small particle size.

Example 2: General Procedure for Impregnating a Fibrous Material (Carbon Fibre) with a Polyamide Powder in a Single-Roll Fluidised Bed The following procedure was performed:
A cylindrical compression roller in the tank (L=500 mm, I=500 mm, H=600 mm), diameter 25 mm.

Residence time of 0.3 sec in powder
Angle $\alpha_1$ at 25°
spreading approximately 100% (meaning a width multiplied by 2) for a ¼" carbon fibre carbon roving Toray, 12K T700S M0E, diameter 7 μm
D50=115 μm. (D10=49 μm, D90=207 μm) for the powder of MPMDT/10T.
D50=132 μm, (D10=72 μm and D90=225 μm) for the powder 11/6T/10T.
edge of the tank equipped with a fixed roller.
The D50/diameter ratio=14.1.

The fibrous material (¼ "carbon fibre roving") was pre-impregnated with a polyamide (PA 11/6T/10T and MPMDT/10T of defined particle size) were prepared according to this procedure and are presented in FIGS. 10 and 11.

FIG. 10 corresponds to MPMDT/10T, FIG. 11 to PA 11/6T/10T.

This demonstrates the effectiveness of the impregnation process with a dry powder in a fluidised bed with a compression roller and monitoring of residence time in powder.

Example 3: General Procedure for Impregnating a Fibrous Material (Glass Fibre) with a Polyamide Powder (PA11 and 11/6T/10T) in a Single-Roller Fluidised Bed The following procedure was performed:
A fixed compression roller in the tank diameter 6 mm
Residence time of about 5 sec
Alpha1 angle of 45°
D50 of 120 μm PA11 powder (D10=60 μm and D90=210 μm).
D50 of 120 μm PA11 powder (D10=60 μm and D90=210 μm).
Edge of the tank equipped with a fixed roller.

The fibrous material (1200 tex fibreglass mesh) was pre-impregnated with different polyamides (PA11 and 11/6T/10T) according to this procedure and are shown in FIGS. 12 and 13. FIG. 12 corresponds to PA11 and FIG. 13 to PA 11/6T/10T.

This demonstrates the effectiveness of the impregnation process with a dry powder in a fluidised bed with a compression roller and monitoring of residence time in powder.

Example 4: General Procedure for Impregnating a Fibrous Material with a Polyamide Powder in a Double-Roller Fluidised Bed Two cylindrical compression rollers with a height difference $H_2-H_1=2$ cm, in the tank (L=500 mm, I=500, H=600), both with a diameter of 25 mm. Roller distance about 1 cm (as shown in FIG. 5)
Residence time of 2 sec in powder
Angle $\alpha_1$ at 25° and angle $\alpha_2$ at 30°
Spreading about 100% (width multiplied by 2) for a ½ "carbon fibre roving" SGL grade AA
D50 of the 98.9 μm powder.
edge of the tank equipped with a rotating roller.

The fibrous material (½ "carbon fibre roving") pre-impregnated with polyamide MPMDT/10T) was prepared according to this procedure and is shown in FIG. 14 (binocular view).

The impregnation rate is 40%.

This demonstrates the effectiveness of the impregnation process with a dry powder in a fluidised bed with two compression rollers and controlling of residence time in the powder.

Example 5: Determination of the Porosity Rate by Image Analysis

Porosity was determined by image analysis on a ½ "carbon fibre roving" impregnated with MPMDT/10T). It is 5%.

Example 6: Determination of the Porosity Ratio the Relative Difference Between Theoretical Density and Experimental Density (General Method)

a) The required data include:
The density of the thermoplastic matrix
Density of the fibres
The weight of the reinforcement:
linear density (g/m) for example for a ¼ inch strip (from a single rowing)
mass per unit area (g/m²) for example for a wider strip or fabric
b) Measurements to be Taken:
The number of samples must be at least 30 for the result to be representative of the studied material.
The measures to be carried out include:
The size of the collected samples:
Length (if linear density known).
Length and width (if weight per unit area known).
The experimental density of the collected samples:
Weight measurements in air and water.
The measurement of the fibre content is determined according to ISO 1172: 1999 or by thermogravimetric analysis (TGA) as determined for example in B. Benzler, Applikationslabor, Mettler Toledo, Giesen, UserCom 1/2001.
The measurement of the carbon fibre content can be determined according to ISO 14127: 2008.
Determination of the Theoretical Fibre Mass Ratio:
a) Determination of the Theoretical Fibre Mass Ratio:

$$\% Mf_{th} = \frac{m_l \cdot L}{Me_{air}}$$

With
$m_l$ the linear density of the strip,
L the length of the sample and
$Me_{air}$ the mass of the sample measured in air.
The variation of fibre mass ratio is supposed to be directly related to a variation of the matrix content without taking into account the variation of the quantity of the fibres in the reinforcement.
b) Determination of the Theoretical Density:

$$d_{th} = \frac{1}{\frac{1-\% Mf_{th}}{d_m} + \frac{\% Mf_{th}}{d_f}}$$

With $d_m$ and $d_f$ being the respective densities of the matrix and the fibres.
The theoretical density thus calculated is the accessible density if there is no porosity in the samples.
c) Evaluation of the Porosity:
Hence, the porosity is the relative difference between theoretical density and experimental density.

The invention claimed is:

1. A process for manufacturing a pre-impregnated fibrous material comprising a fibre material made of continuous carbon fibres and at least one thermoplastic polymer matrix,
wherein the pre-impregnated fibrous material is made of a single unidirectional ribbon or of a plurality of unidirectional parallel ribbons,
wherein the process comprises an impregnation step of the fibrous material in the form of a roving or of several parallel rovings by the thermoplastic polymer in powder form, the impregnation step being carried out with the at least one thermoplastic polymer and the fibrous material,
wherein the D90/D10 ratio by volume of the thermoplastic polymer particles ranges from 2 to 10,
wherein the ratio of the mean volume diameter (D50) of the thermoplastic polymer particles to the average diameter unit fibres of the fibrous material ranges from 3 to 40, and excluding any electrostatic process in voluntary charge,
wherein the impregnation step is carried out in a fluidised bed, by continuous passage of the carbon fibres in an aqueous dispersion or by spraying using a spray gun(s) or powder coating nozzle(s),
wherein a creel is present before a tank comprising the fluidised bed for controlling tension of the roving(s) at the tank inlet comprising the fluidised bed, and
wherein the pre-impregnated fibrous material has a fibre content of 45 to 65% by volume and a porosity rate of from 1 to 10%.

2. The process according to claim 1, wherein the fibrous material consists of glass fibres and the D50/average diameter ratio of the unit fibres ranges from 3 to 15.

3. The process according to claim 1, wherein each of the carbon fibres as a unit has a D50/average diameter ratio of from 10 to 40.

4. The process according to claim 1, wherein the impregnation stage is carried out by a dry fluidised bed in a tank and the control of the content of the at least one thermoplastic polymer matrix in the fibrous material is performed by controlling the residence time of the fibrous material in the powder.

5. The process according to claim 4, wherein the residence time in the powder ranges from 0.01 s to 10 s.

6. The process according to claim 4, wherein the tank comprises a fluidised bed and the impregnation step is carried out with simultaneous spreading of the roving or the rovings between the inlet and outlet of the fluidised bed.

7. The process according to claim 6, wherein the fluidised bed comprises at least one tension device, the roving or the rovings being in contact with a part or the whole of the surface of the at least one tension device.

8. The process according to claim 7, wherein the spreading of the roving or the rovings is performed at least at the at least one tension device.

9. The process according to claim 7, wherein the at least one tension device is a convex, concave or cylindrical compression roller.

10. The process according to claim 9, wherein the at least one compression roller is cylindrical in shape and the percentage of spreading of the roving or the rovings between the inlet and the outlet of the fluidised bed being comprised from 1% to 400%.

11. The process according to claim 10, wherein a single compression roller is present in the fluidised bed and the impregnation is effected at an angle $\alpha_1$ formed by the roving or the rovings between the inlet of the compression roller and the vertical tangent to the compression roller.

12. The process according to claim 11, wherein the angle $\alpha_1$ ranges from 0 to 89°.

13. The process according to claim 10, wherein two compression rollers $R_1$ and $R_2$ are present in the fluidised bed and the impregnation is performed at an angle $\alpha_1$ formed by the roving or the rovings between the inlet of the compression roller $R_1$ and the vertical tangent to the compression roller and/or at an angle $\alpha_2$ formed by the roving or the rovings between the inlet of the compression roller $R_2$ and the vertical tangent to the compression roller $R_2$, the compression roller $R_1$ preceding (in the running direction of the process) the compression roller $R_2$ and the roving or the rovings being able to run above or below the roller $R_2$.

14. The process according to claim 13, wherein the two compression rollers $R_1$ and $R_2$ are 0.15 mm apart at the length equivalent to the maximum dimension of the tank and in that the difference in height between the two compression rollers $R_1$ and $R_2$ ranges from 0 to the height corresponding to the maximum height of the tank subtracted from the diameters of the two compression rollers, $R_2$ being the upper compression roller.

15. The process according to claim 1, wherein a single thermoplastic polymer matrix is used and the thermoplastic polymer powder is fluidisable.

16. The process according to claim 1, further comprising a step of shaping the roving or the parallel rovings of the impregnated fibrous material, by calendering using at least one heating calender in the form of a single unidirectional ribbon or a plurality of unidirectional parallel ribbons with, in the latter case, the heating calender comprising a plurality of calendering grooves, in accordance with the number of the ribbons and with a pressure and/or spacing between the rollers of the calender controlled by closed-loop system.

17. The process according to claim 16, wherein the calendering step is performed using a plurality of heated calenders, connected in parallel and/or in series with respect to the direction of movement of the fibre rovings.

18. The process according to claim 16, wherein the heated calender comprises a microwave or induction integrated heating system coupled to the presence of carbonaceous charges in the thermoplastic polymer or mixture of thermoplastic polymers.

19. The process according to claim 16, wherein the heating calender is coupled to a rapid supplementary heating device, located before and/or after the (each) calender.

20. The process according to claim 16, wherein the impregnation stepis completed by a coating step of the single roving or the plurality of parallel rovings after impregnation with the powder, the coating step being carried out before the calendering step, by a molten thermoplastic polymer, which can be identical or different from the polymer in the form of powder in a fluidised bed.

21. The process according to claim 1, wherein the thermoplastic polymer further comprises carbonaceous fillers.

22. The process according to claim 1, wherein the thermoplastic polymer further comprises liquid crystal polymers or cyclised poly (butylene terephthalate), or mixtures containing them as additives.

23. The process according to claim 1, wherein the at least one thermoplastic polymer is selected from: polyether ketone ketones (PEKK), polyaryl ether ketones (PAEK), polyaryl ether ketone ketone (PAEKK), aromatic polyetherimides (PEI), polyaryl sulfones, polyarylsulphides, polyamides (PA), PEBAs, polyacrylates, polyolefins, polylactic acid (PLA), polyvinyl alcohol (PVA), and fluorinated polymers, and mixtures thereof.

24. The process according to claim 23, wherein the at least one thermoplastic polymer is a polymer having a glass transition temperature such that Tg≥80° C. or is a semi-crystalline polymer having a melting point Tf≥150° C.

25. The process according to claim 1, wherein the fibrous material comprises continuous fibres selected from carbon fibres, glass, silicon carbide, basalt, silica, natural fibres, in particular flax or hemp, lignin, bamboo, sisal, silk, or cellulosic, in particular viscose, or amorphous thermoplastic fibres with a glass transition temperature Tg greater than the Tg of the polymer or the polymer mixture when the latter is amorphous or greater than the Tf of the polymer or the polymer mixture when the latter is semi-crystalline, or the semi-crystalline thermoplastic fibres with a melting temperature Tf greater than the Tg of the polymer or the polymer mixture when the latter is amorphous or higher at the Tf of the polymer or the polymer mixture when the latter is semi-crystalline, or a mixture of two or more of the fibres.

26. A process of manufacturing three-dimensional composite parts, comprising automatically removing by a robot the ribbons prepared by the process according to claim 1.

27. The process according to claim 26, where the ribbon is of a pre-impregnated fibrous material.

28. The process according to claim 27, wherein the manufacture of the composite parts relates to transportation, oil and gas, gas storage, civil aviation or military, nautical, railway; renewable energy, thermal protection panels; sports and recreation, health and medical, ballistics with weapon or missile parts, security and electronics.

* * * * *

UNITED STATES PATENT AND TRADEMARK OFFICE
CERTIFICATE OF CORRECTION

PATENT NO. : 11,945,135 B2
APPLICATION NO. : 16/470390
DATED : April 2, 2024
INVENTOR(S) : Gilles Hochstetter et al.

It is certified that error appears in the above-identified patent and that said Letters Patent is hereby corrected as shown below:

In the Claims

In Column 31, Claim 19, Line 47: change "device ," to -- device, --.

In Column 31, Claim 20, Line 49: change "stepis" to -- step is --.

Signed and Sealed this
Seventeenth Day of June, 2025

Coke Morgan Stewart
*Acting Director of the United States Patent and Trademark Office*